(12) United States Patent
Laker

(10) Patent No.: US 10,789,209 B2
(45) Date of Patent: Sep. 29, 2020

(54) METHOD AND APPARATUS TO ENABLE FINER-GRAINED, SCALABLE ALLOCATION OF STORAGE IN A DATA STORAGE SYSTEM

(71) Applicant: Hitachi Vantara LLC, Santa Clara, CA (US)

(72) Inventor: Mark Stephen Laker, Eastleigh (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 657 days.

(21) Appl. No.: 14/764,648

(22) PCT Filed: Feb. 1, 2013

(86) PCT No.: PCT/US2013/024350
§ 371 (c)(1),
(2) Date: Jul. 30, 2015

(87) PCT Pub. No.: WO2014/120240
PCT Pub. Date: Aug. 7, 2014

(65) Prior Publication Data
US 2015/0370823 A1    Dec. 24, 2015

(51) Int. Cl.
*G06F 16/17* (2019.01)
*G06F 16/13* (2019.01)
(Continued)

(52) U.S. Cl.
CPC ........ *G06F 16/1727* (2019.01); *G06F 3/0607* (2013.01); *G06F 3/0631* (2013.01);
(Continued)

(58) Field of Classification Search
CPC ........... G06F 17/30138; G06F 17/3007; G06F 17/30321; G06F 3/0631; G06F 3/0689;
(Continued)

(56) References Cited

U.S. PATENT DOCUMENTS

| 4,849,878 A * | 7/1989 | Roy .................... G06F 3/0601 |
| 7,502,908 B2 * | 3/2009 | Yudenfriend ........... G06F 12/04 |
| | | 711/212 |

(Continued)

OTHER PUBLICATIONS

Chinese Office Action received in corresponding Chinese Application No. 201380071937.1 dated Jun. 9, 2017.

*Primary Examiner* — Pierre M Vital
*Assistant Examiner* — Andalib F Lodhi
(74) *Attorney, Agent, or Firm* — Mattingly & Malur, PC

(57) ABSTRACT

In one aspect, the invention is directed to a method of expanding storage for filesystems in a fine-grained, scalable manner. The method includes determining, by a file server, a run bias for a span, wherein the run bias indicates a number of contiguous chunks of memory associated with an entry in an address translation table for a filesystem. The method includes receiving, by the file server, a request for an expansion of memory for the filesystem. The method includes scoring, by the chunk allocator, each stripe set in a group of stripe sets based at least in part on a number of unused chunks on the stripeset and a number of chunks on the stripeset being used by the filesystem. The method includes allocating, by the chunk allocator, a chunk on the stripeset with the highest score, wherein the allocated chunk lies outside of runs reserved for other filesystems.

11 Claims, 17 Drawing Sheets

(51) Int. Cl.
  *G06F 16/182* (2019.01)
  *G06F 16/188* (2019.01)
  *G06F 16/22* (2019.01)
  *G06F 16/11* (2019.01)
  *G06F 3/06* (2006.01)

(52) U.S. Cl.
  CPC ............ *G06F 3/0689* (2013.01); *G06F 16/11* (2019.01); *G06F 16/13* (2019.01); *G06F 16/182* (2019.01); *G06F 16/183* (2019.01); *G06F 16/188* (2019.01); *G06F 16/2228* (2019.01)

(58) Field of Classification Search
  CPC ......... G06F 17/30091; G06F 17/30203; G06F 17/30233; G06F 3/0607; G06F 17/30194; G06F 16/901; G06F 16/182; G06F 16/22; G06F 16/27; G06F 16/334; G06F 16/71; G06F 16/903; G06F 16/1727; G06F 16/11; G06F 16/2228; G06F 16/188; G06F 16/183; G06F 16/13
  See application file for complete search history.

(56) References Cited

U.S. PATENT DOCUMENTS

| | | | |
|---|---|---|---|
| 2002/0124137 A1* | 9/2002 | Ulrich | G06F 3/0613 711/113 |
| 2004/0015672 A1* | 1/2004 | Masse | G06F 3/0605 711/173 |
| 2005/0270930 A1* | 12/2005 | Uemura | G06F 21/64 369/47.1 |
| 2007/0260842 A1* | 11/2007 | Faibish | G06F 3/061 711/170 |
| 2009/0327368 A1 | 12/2009 | Aston et al. | |

* cited by examiner

| stripeset | Used 1 | Used 2 | - - - | Free 1 | Free 2 | Free 3 | Free 4 | Free 5 | - - - | Used 3 | Used 4 |

FIG. 5

| Chunk pointers | Size |
|---|---|
| Address 1 | X |
| Address 2 | X |
| Address 3 | X |
| (Blank) 9040 | X |
| (Blank) 9041 | X |
| (Blank) 9042 | X |
| (Blank) 9043 | |
| (Blank) 9044 | |
| (Blank) 9045 | |

FIG. 6 (PRIOR ART)

| Pointer – start of run | Pointer – end of run |
|---|---|
| Start address 1 | End address 1 |
| Start address 2 | End address 2 |
| Start address 3 | End address 3 |
| Start address 4 9040 | End address 4 9050 |
| (Blank) 9041 | (Blank) 9051 |
| (Blank) 9042 | (Blank) 9052 |

| Pointer – start of run | Pointer – end of run |
|---|---|
| Start address 1 | End address 1 |
| Start address 2 | End address 2 |
| Start address 3 | End address 3 |
| Start address 4 9040 | End address 4 + (size of 2 chunks) 9050 |
| (Blank) 9041 | (Blank) 9051 |
| (Blank) 9042 | (Blank) 9052 |

FIG. 8

METHOD AND APPARATUS TO ENABLE FINER-GRAINED, SCALABLE ALLOCATION OF STORAGE IN A DATA STORAGE SYSTEM

CROSS-REFERENCE TO RELATED APPLICATION(S)

This application is a U.S. national phase filed under 35 U.S.C. 371 of, and therefore claims priority from, International Application No. PCT/US2013/024350 filed Feb. 1, 2013, which is hereby incorporated herein by reference in its entirety.

FIELD OF THE INVENTION

The present invention relates to data storage systems, and, more particularly, to data storage systems capable of fine-grained, scalable allocation of disk space to filesystems.

BACKGROUND

In today's information age, data storage systems often manage filesystems that require dynamic expansion of disk space from time to time. Often, the filesystem is expanded in increments of storage (referred to herein as a "chunk"). The data storage system may allow for different guideline chunk sizes to be selected, although the storage system may allocate chunks whose sizes deviate from the guideline chunk size. In one exemplary data storage system, chunk sizes can range from 1 gigabytes (GiB) to 100 GiB. In another exemplary data storage system, chunk sizes can range from 0.5 GiB to 18 GiB.

The file servers of such systems translate the virtual addresses of disk space in the filesystem space into the addresses of disk space in physical storage, and may use a fixed-size table to track the chunks of disk space allocated to the filesystem (e.g., a table having 1023 entries in one exemplary data storage system, where each entry is used to store, for example, the starting physical address of a chunk and information regarding the size of the chunk (e.g., the chunk length or the ending address of the chunk) and maps to a range of virtual filesystem addresses). The use of a fixed-size table generally restricts the maximum size of the filesystem, i.e., allowing only a predetermined maximum number of chunks to be allocated to the filesystem. This fixed-size table may be implemented in hardware and, in any case, it may be impracticable to increase the table size to allow larger filesystems to be supported.

Selection of the guideline chunk size for a particular filesystem is essentially a tradeoff between how large the user expects the filesystem to grow and the efficiency of storage utilization. Generally speaking, selection of a small guideline chunk size provides for efficient storage utilization but limits the maximum size of the filesystem, while selection of a large guideline chunk size often results in inefficient storage utilization but increases the maximum filesystem size.

SUMMARY OF THE EXEMPLARY EMBODIMENTS

In certain embodiments there is provided a method and data storage system for expanding storage for a filesystem that includes a plurality of chunks selected from a plurality of stripesets, wherein a virtual address space of the filesystem is mapped to physical storage addresses associated with the chunks. The method involves maintaining a chunk database to track the chunks associated with the filesystem, the chunk database including a fixed number of entries, each entry capable of storing information regarding the starting address and length of a portion of storage allocated to the filesystem; receiving a request to expand the filesystem; identifying a last chunk associated with the filesystem based on the chunk database; allocating at least one chunk from the same stripeset as the last chunk and contiguous with the last chunk when the at least one chunk is available for the allocation to the filesystem; and updating an entry in the chunk database associated with the last chunk to reflect the increase in the length of contiguous storage represented by the at least one allocated chunk.

In various alternative embodiments, prior to determining if at least one chunk from the same stripeset as the last chunk and contiguous with the last chunk is available for allocation to the filesystem, the at least one chunk from the same stripeset as the last chunk and contiguous with the last chunk may be reserved so that the at least one chunk remains available.

Determining if at least one chunk from the same stripeset as the last chunk and contiguous with the last chunk is available for allocation to the filesystem may involve determining an active run length for the filesystem and determining that there is at least one chunk available for allocation to the filesystem when the active run length is less than a run bias and there is at least one chunk from the same stripeset as the last chunk and contiguous with the last chunk. In this regard, allocating at least one chunk may involve allocating up to N chunks from the same stripeset as the last chunk and contiguous with the last chunk, where N is equal to the run bias minus the active run length. The method may also involve determining the run bias, such as by determining the run bias based on a number of stripesets and a number of filesystems.

The method may further involve allocating at least one chunk from a different stripeset, when such at least one chunk from the same stripeset as the last chunk and contiguous with the last chunk is determined to be unavailable.

In certain embodiments, the chunk database may be maintained in hardware, and the data storage system may include an interface coupled between a software-based chunk allocator and the hardware through which the chunk allocator accesses the chunk database.

In other embodiments there is provided a method and data storage system for expanding storage for filesystems in a fine-grained, scalable manner. The method includes determining, by a file server, a run bias for a span, wherein the run bias indicates a number of contiguous chunks of disk space associated with an entry in an address translation table for a filesystem. The method includes receiving, by the file server, a request for an expansion of disk space for the filesystem. The method includes scoring, by the chunk allocator, each stripeset in a group of stripesets based at least in part on a number of unused chunks on the stripeset and a number of chunks on the stripeset being used by the filesystem. The method includes allocating, by the chunk allocator, a chunk on the stripeset with the highest score, wherein the allocated chunk lies outside of runs reserved for other filesystems.

Determining the run bias for a span may include determining, by the file server, a default run bias. Determining the run bias for a span may include determining, by the file server, the run bias based on a number of stripesets and a number of filesystems.

Scoring each stripeset may include determining, by the chunk allocator, that a chunk after a last allocated chunk of the filesystem is available; determining, by the chunk allocator, a bias factor for a current stripeset of the filesystem, wherein the current stripeset includes the last allocated chunk of the filesystem; and scoring, by the chunk allocator, the current stripeset with the bias factor. Scoring each stripeset may include determining, by the chunk allocator, that a chunk after a last allocated chunk of the filesystem is used by another filesystem; and scoring, by the chunk allocator, each stripeset in a group of stripesets based at least in part on a difference between a number of unused chunks on the stripeset and a number of chunks reserved for other filesystems. Scoring each stripeset may include scoring, by the chunk allocator, each stripeset in the group of stripesets based at least in part on a number of unused chunks on the stripeset, a span weight, a number of chunks on the stripeset being used by the filesystem, and a filesystem weight.

Allocating the chunk on the stripeset with the highest score may include selecting, by the chunk allocator, a chunk after a last allocated chunk of the filesystem. Allocating the chunk on the stripeset with the highest score may include searching, by the chunk allocator, for a run of unreserved chunks whose length is at least the run bias; and selecting, by the chunk allocator, a first chunk in the run. Allocating the chunk on the stripeset with the highest score may include searching, by the chunk allocator, for a run of reserved chunks whose length is at least the run bias; and selecting, by the chunk allocator, a first chunk in a second half of the run.

In still other embodiments there is provided a method and data storage system for expanding storage for a filesystem including a plurality of chunks selected from a plurality of stripesets, wherein a virtual address space of the filesystem is mapped to physical storage addresses associated with the chunks. The method involves maintaining a chunk database to track the chunks associated with a plurality of filesystems, the chunk database including a fixed number of entries, each entry capable of storing information regarding the starting address and length of a portion of storage allocated one of the filesystems; receiving a request to expand a filesystem in the plurality of filesystems; selecting a stripeset from which to allocate storage; retrieving an entry from the chunk database with a starting address on the stripeset, wherein the entry corresponds to a live run of a different filesystem in the plurality of filesystems; identifying at least one chunk on the stripeset that is positioned after N chunks that follow and are contiguous with a last chunk in the live run, wherein N is equal to a run bias minus an active run length of the live run; and allocating the at least one chunk to the filesystem if the at least one chunk is available.

In various alternative embodiments, the method may further involve continuing to retrieve entries from the chunk database with a starting address on the stripeset and identify at least one chunk that is positioned after N chunks that follow and are contiguous with a last chunk in the live run until the at least one chunk is available. Identifying at least one chunk on the stripeset may involve identifying a run of available chunks equal to a run bias or identifying a longest run of available chunks on the stripeset.

In still other embodiments there is provided a method and data storage system for expanding storage for a filesystem including a plurality of chunks selected from a plurality of stripesets, wherein a virtual address space of the filesystem is mapped to physical storage addresses associated with the chunks. The method involves maintaining a chunk database to track the chunks associated with a plurality of filesystems, the chunk database including a fixed number of entries, each entry capable of storing information regarding the starting address and length of a portion of storage allocated one of the filesystems; receiving a request to expand a filesystem in the plurality of filesystems; determining a number of chunks for the request exceeds a number of chunks in a run bias multiplied by a number of stripesets on a span; determining a number of chunks to allocate from each stripeset by dividing the number of chunks for the request by the number of stripesets; searching, on each stripeset, for a run of available chunks equal to the number of chunks to allocate from each stripeset; allocating, from each stripeset, the run of available chunks; and creating, for each run of available chunks, an entry in the chunk database associated with the run of available chunks, wherein the entry includes a length of the run.

Embodiments also may include computer programs configured to perform any of the above methods.

Embodiments also may include apparatus comprising a tangible computer-readable medium having embodied therein computer programs configured to perform any of the above methods.

Additional embodiments may be disclosed and claimed.

BRIEF DESCRIPTION OF THE DRAWINGS

The foregoing features of the invention will be more readily understood by reference to the following detailed description, taken with reference to the accompanying drawings, in which:

FIG. 5 is a schematic representation of chunks in a stripeset including some chunks that are already used and some chunks that are free to be allocated to a filesystem;

FIG. 6 is a schematic representation of the table 9025 as might be found at a particular point in time in an exemplary prior art embodiment, where information for each new chunk is stored in a separate table entry;

FIG. 7 is a schematic representation of the table 9025 as might be found at a particular point in time in an exemplary embodiment where information for contiguous chunks may be stored in a single table entry, in lieu of the table 9025 shown in FIG. 6;

FIG. 8 is a schematic representation of the table 9025 showing how the table entry 9030 of FIG. 7 is modified to incorporate the two additional contiguous chunks in accordance with one exemplary embodiment;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
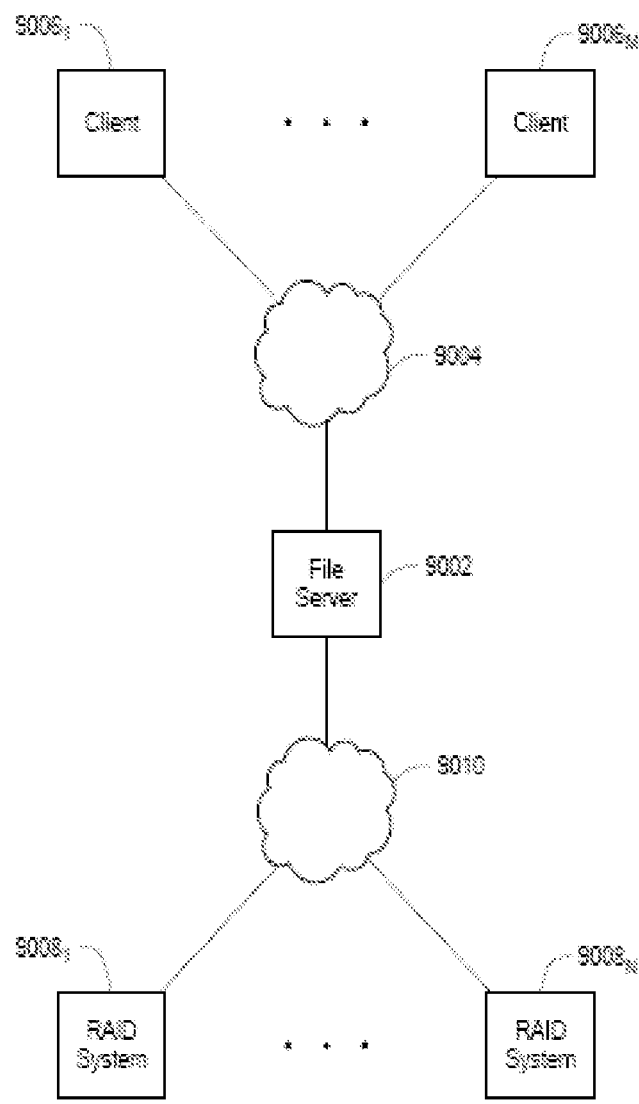
FIG. 1 is a schematic block diagram of a file storage system in accordance with an exemplary embodiment of the present invention.

Definitions. As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs, although in various embodiments, exemplary RAID systems may have more. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. In some embodiments, a filesystem is a virtualized region of disk space that resides on the chunks of one or more stripesets. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. In some embodiments, a stripeset can include up to thirty-two (32) logical units ("LUs"). A stripeset is "full" if all of its chunks are being used. Otherwise, the stripeset is "non-full." A "span" is composed of one or more stripesets (e.g., up to 64 stripesets, where the stripesets need not have the same capacity or contain the same number of LUs as one another). In some embodiments, a span includes multiple filesystems (e.g., up to 128 filesystems). Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually. In certain embodiments, a file server stores the virtual and physical addresses of the filesystem's disk space in a "chunk database." Discontiguous chunks of disk space on the span appear to be a continuous disk space for the filesystem's purposes. In various embodiments, the file server stores information about the filesystem's disk space in entries of a table on a disk interface (DI) chip. Each entry in a table includes the beginning and ending locations of a portion of disk space allocated to the filesystem.

A "chunk" is a region of disk space on a single stripeset. In some embodiments, the chunk may be an increment of disk space added to a filesystem. Each chunk resides on a single stripeset, e.g., chunks do not span multiple stripesets. In some embodiments, the size of a chunk may range between 1 Gigabytes (GiB) and 100 GiB. When a chunk has not been allocated to a filesystem, the chunk is "available" or "free." When a chunk has been allocated, the chunk is "used" and cannot be allocated to another filesystem or reused in the same filesystem. Chunks are either "free" or "used," e.g., a chunk cannot be partly used and partly free. In some embodiments, an administrator sets a guideline chunk size when a span is created. The guideline chunk size is an approximation of a chunk's size in the span. The file server is allowed to allocate chunks of different sizes.

Therefore, chunks in a span may have different capacities from one another and different capacities from the guideline chunk size.

A "run" is a sequence of one or more chunks that are contiguous within a filesystem space and within a logical unit space. Thus, a file server could perform a single continuous read or write operation to all the chunks in a run. Further, the read or write operation could be translated into a comparable operation to each of the logical units in a stripeset, beginning with the same address on each logical unit and ending with the same address on each logical unit. In typical embodiments, under certain circumstances, a run can begin as a single chunk and be expanded to include multiple contiguous chunks from a single stripeset.

A "run bias" is a preferred length of a run that is stored in a single entry in a table that stores addresses of disk space allocated to a filesystem. The run bias may indicate the extent to which the file server may tolerate load imbalance among the stripesets. When the run bias is lower, the file server more frequently allocates chunks from different stripesets to keep the load balanced across the span (e.g., the file server allocates fewer chunks from one stripeset before it begins allocating chunks from another). In some embodiments, when the span has few chunks but many stripesets, the file server determines a lower run bias to improve load balancing across the span.

A "live run" is a run of chunks allocated to a filesystem that can be expanded. The run is the last run in the filesystem, and the run is immediately followed by a free chunk on the same stripeset as the run.

A run of free chunks on a stripeset can be divided into two runs. One of the runs is a "claimed run," which is a run of free chunks that immediately follows a live run whose length is shorter than the run bias. The claimed run may include the number of chunks needed to extend the live run so its length is equal to the run bias.

An "unclaimed run" is a run of free chunks that immediately follows a claimed run. The chunk allocator is free to allocate chunks from an unclaimed run.

A "chunk database" is a storage construct used to track the chunks associated with one or more filesystems. FIG. 1 is a schematic block diagram of a file storage system in accordance with one exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 manages one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs, although in some examples, each RAID system may be configured for more. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Figure 2:
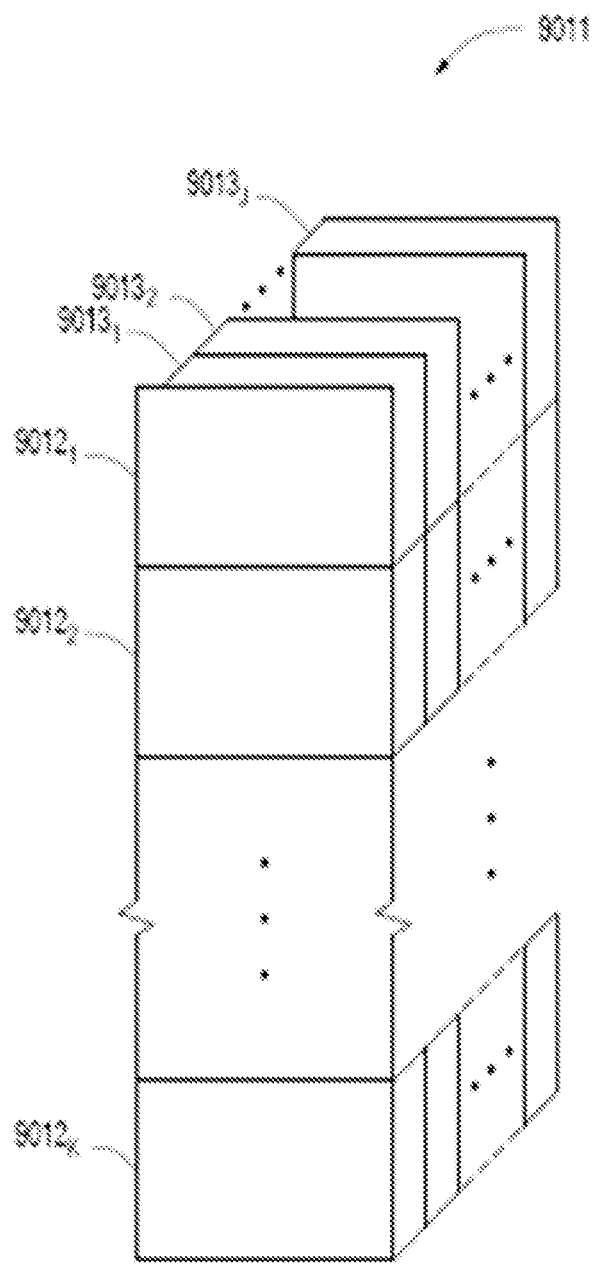
FIG. 2 is a schematic block diagram showing the general format of a filesystem in accordance with an exemplary embodiment of the present invention.

FIG. 2 is a schematic block diagram of a span in accordance with an exemplary embodiment of the present invention. As shown, the span 9011 is composed of a number of stripesets numbered $9012_1$-$9012_K$ that logically provide a contiguous storage space. Each stripeset 9012 in turn is composed of one or more ranges and therefore one or more SDs. In this example, stripeset $9012_1$ includes ranges numbered $9013_1$-$9013_J$.

When a large amount of data is written to a stripeset, the file server 9002 generally "stripes" the data across multiple ranges/SDs in the stripeset rather than writing all of the data to a single range/SD. For example, when a large amount of data is written, the file server 9002 may write the first 4 MB of data in range/SD $9013_1$, the next 4 MB of data in range/SD $9013_2$, and so on, recycling back to range/SD $9013_1$ after writing data to range/SD $9013_J$. Among other things, such "striping" increases the chances that the file server 9002 is using several SDs (and hence several storage devices), possibly managed by several RAID systems.

It should be noted that, in an exemplary embodiment, the span 9011 initially contains a single stripeset when the span is created, but additional stripesets may be added to the span over time, and different stripesets may have different numbers of ranges/SDs. In an exemplary embodiment, each stripeset can contain up to 32 SDs, regardless of their capacities. Each SD may be mirrored, but such mirroring is performed by the RAID systems rather than by the file server 9002; therefore, for mirrored SDs, the file server 9002 sends commands only to the primary SD, and only the primary SD counts towards the limit of 32 SDs per stripeset. Also, in an exemplary embodiment, once a stripeset is created, no more SDs are added to that stripeset. Therefore, in order to add SDs to the span, a new stripeset is formed for the additional SDs, and the new stripeset is essentially concatenated to the existing stripeset(s) in the span.

Thus, for example, a span initially may include a single stripeset having four SDs numbered 0-3. In order to add three new SDs numbered 5-7 to the span, a second stripeset including SDs 5-7 is created, and the second stripeset is concatenated to the first stripeset. The existing data is not "re-striped" across all seven SDs in the span.

In essence, a filesystem can be viewed as a contiguous storage space having N sequential blocks of storage. For the sake of this discussion, the blocks can be logically numbered sequentially from 0 to N–1. In actuality, the filesystem storage space may be physically non-contiguous within the span, and may include storage from multiple stripesets. Generally speaking, the file server 9002 maps filesystem storage blocks to physical storage locations within the span. Thus, in an exemplary embodiment in which a filesystem includes storage from multiple stripesets, a first set of filesystem storage blocks will map to a first stripeset, a second set of filesystem storage blocks will map to a second stripeset, and so on.

Figure 3:
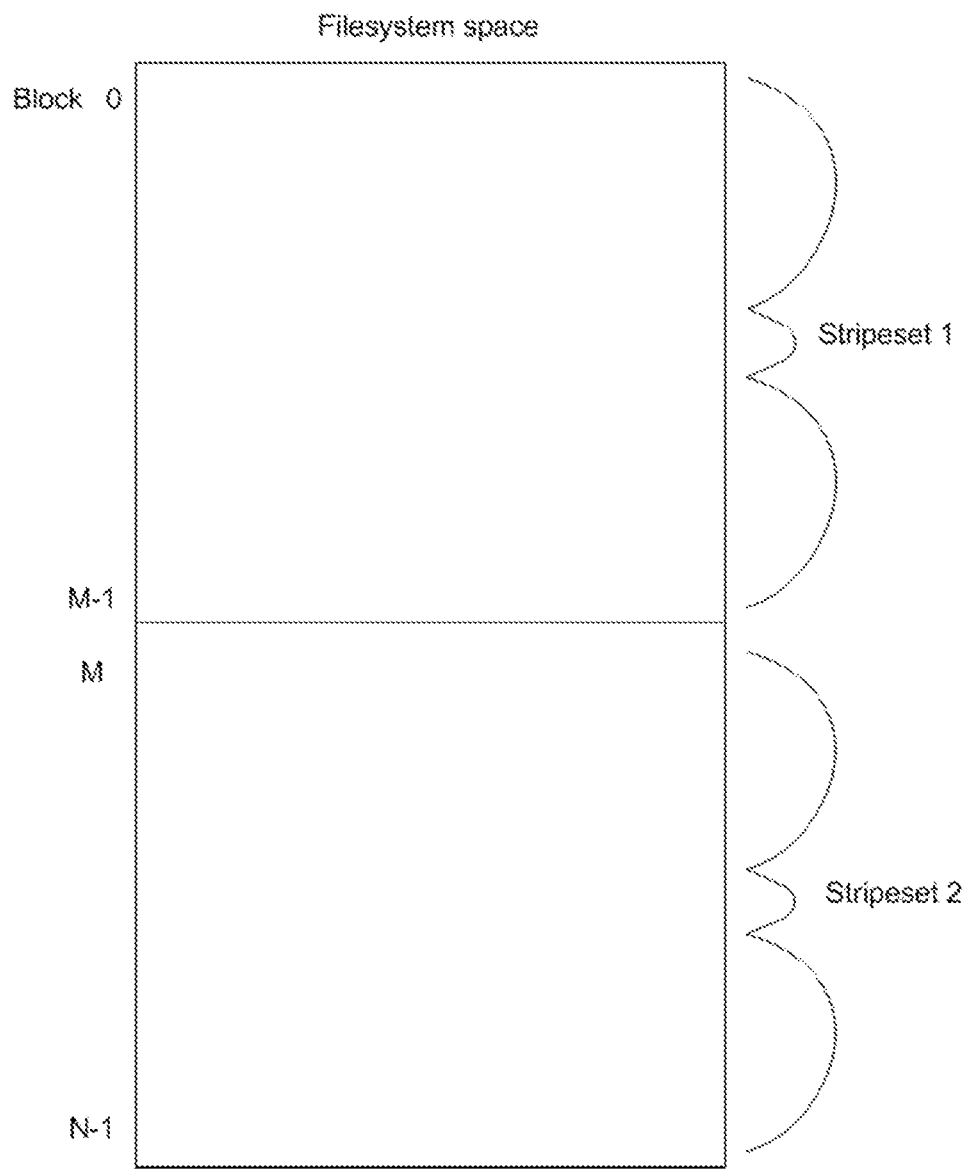
FIG. 3 is a schematic diagram showing the relationship between storage blocks and stripesets in an exemplary embodiment of the present invention.

FIG. 3 is a schematic diagram showing the relationship between storage blocks and stripesets in an exemplary embodiment of the present invention. In this example, there are N storage blocks numbered 0-(N–1) comprising chunks from two stripesets, where the first M blocks (numbered 0 to M–1) map to chunks from stripeset 1 and the remaining N-M of the blocks (numbered M to N–1) map to chunks from stripeset 2. It should be noted that there may be many millions of blocks associated with each stripeset, and the number of blocks may be different in each stripeset. It should be noted that, because allocations are made to the filesystem over time, a typical filesystem will have many ranges from each stripeset. For example, it may have 7 GiB from stripeset 0, 9 GiB from stripeset 2, 13 GiB from stripeset 1, 11 GiB from stripeset 0, 18 GiB from stripeset 1, 8 GiB from stripeset 0, 21 GiB from stripeset 2, and so on. Furthermore, it can have several consecutive ranges from different regions of the same stripeset, which is especially likely if the span contains only one or two stripesets.

Figure 4:
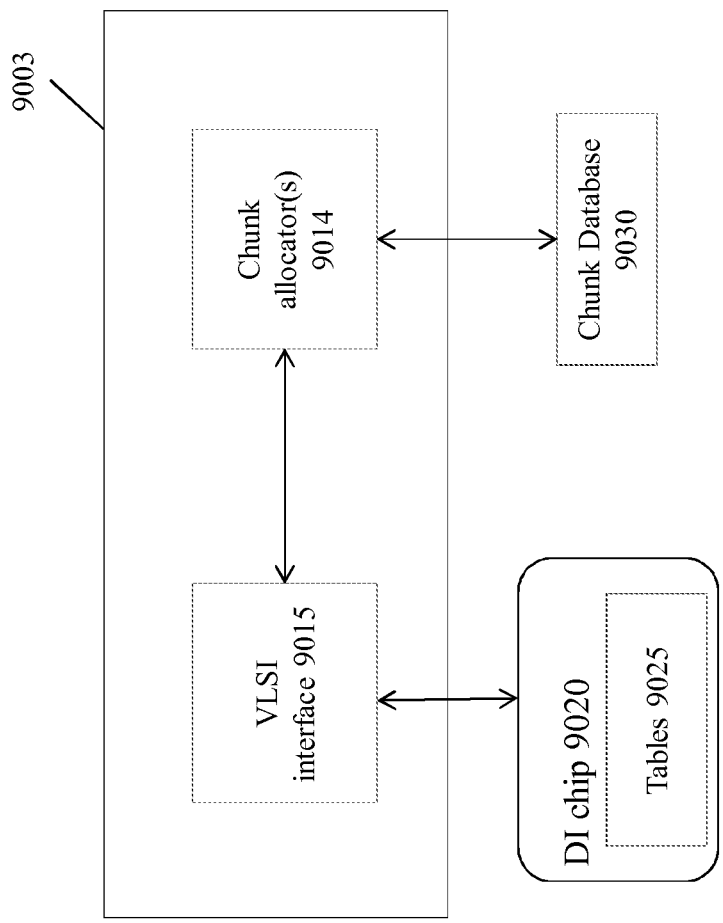
FIG. 4 is a schematic block diagram of a file server of the file storage system.

FIG. 4 is a schematic block diagram of a span manager 9003 on the file server 9002, in accordance with one exemplary embodiment. Among other things, the span manager 9003 includes one or more chunk allocators 9014 and a VLSI interface 9015 through which the span manager 9003 interfaces with various hardware-based filesystem components, including a disk interface (DI) chip 9020 with tables 9025 that store the locations of runs allocated to the filesystems. The span manager 9003 also interfaces with a chunk database 9030 that stores information regarding chunks allocated to the filesystems. In many embodiments, the chunk database 9030 stores information about every chunk on the span. The chunk database 9030 is maintained on disk, in memory, or both. The chunk allocator 9014 of the span manager 9003 manipulates the chunk database 9030.

The DI chip 9020 is responsible for connectivity to physical storage (e.g., disk and/or solid-state storage on a back-end Fibre Channel SAN) and for controlling how data is stored and spread across those physical devices. When the span manager 9003 receives a request from a client device 9006 to expand the disk space of a filesystem, a chunk allocator 9014 determines which chunk(s) to allocate to the filesystem.

In some embodiments, the file server 9002 includes a single chunk allocator 9014. The chunk allocator 9014 stores sets of span weights and filesystem weights, as described further herein, for different spans. The chunk allocator 9014 selects the span weight and filesystem weight based on the span on which the filesystem being expanded resides. In other embodiments, the file server 9002 includes different chunk allocators 9014, each chunk allocator 9014 storing a different set of span and filesystem weights. In some embodiments, the span manager 9003 selects a chunk allocator 9014 based on the client device 9006. In some embodiments, the span manager 9003 selects a chunk allocator 9014 based on the filesystem to be expanded.

The chunk allocator 9014 determines the virtual addresses of chunks and the corresponding physical addresses in disk space on the logical units, as well as the device identifiers for the logical units. The chunk allocator 9014 stores information regarding the allocated chunk(s) in the chunk database 9025 and in the tables 9025 in the DI chip 9020. In some embodiments, the chunk allocator 9014 stores information about each individual allocated chunk in the chunk database 9025. The chunk allocator 9014 also, through the VLSI interface 9015, updates tables 9025 on the DI chip 9020 to reflect the newly allocated chunk(s).

In some embodiments, the tables 9025 include volume mapping tables and stripeset mapping tables. The chunk allocator 9014 stores and/or updates the beginning and ending addresses in the filesystem space for a run in an entry of a volume mapping table. The stripeset mapping table stores the relationships between addresses in the filesystem space with addresses in the SD space. Thus, using the volume mapping and stripeset mapping tables, a filesystem can access the chunks of disk space that have been allocated to it. In some embodiments, the chunk allocator 9014 stores information such as, the virtual addresses, physical addresses, and device identifiers corresponding to chunks. In some embodiments, the virtual address is a filesystem offset, the device identifier is an LU device identifier, and the physical address is an offset on a logical unit.

In exemplary embodiments, when a filesystem is expanded by one or more chunks, rather than allocating chunks from stripesets in a haphazard manner and using a separate table entry in the chunk database 9025 for each added chunk, the span manager 9003, and specifically the chunk allocator 9014, under certain circumstances discussed more fully below, allocates one or more chunks from the same stripeset as, and contiguous with, the last existing chunk in the filesystem (i.e., the chunk(s) associated with the last populated entry in the chunk database 9025) and the corresponding entry in the chunk database 9025 is updated to reflect the effective increase in disk space allocated to the filesystem. In this way, the range of virtual filesystem addresses associated with the last table entry grows and maps to multiple contiguous chunks of physical storage, without utilizing additional table entries and hence leaving those table entries available for further expansion. As a result, the filesystem generally can be expanded so as to include a larger number of chunks without expanding the size of the table (e.g., more than 1023 chunks in a system that uses a fixed-size table having 1023 entries).

FIG. 5 is a schematic representation of chunks in a stripeset including some chunks that are already used and some chunks that are free to be allocated to a filesystem. For convenience, the "free" chunks are referred to as "free 1," "free 2," etc. In this embodiment, the stripeset includes discontiguous runs of used chunks. Used chunks 1 and 2 are allocated to the same filesystem. When the file server 9002 searches for free chunks to allocate to a different filesystem, the file server 9002 searches past a predetermined number of free chunks that follow the live run for the filesystem (e.g., the claimed run), as described further herein. Thus, the file server 9002 bypasses free chunks so that the filesystem may later expand into the chunks in the claimed run. The file server 9002 allocates a chunk after the claimed run, e.g., chunk "used 3," to the different filesystem. For sake of demonstration, say that a request is received for the span manager 9003 to expand a given filesystem by three chunks of size X. The span manager allocates three chunks from available storage. While the three chunks could come from a single stripeset or from two or three different stripesets, for this demonstration, it is assumed that chunks "free 1," "free 2," and "free 3" from FIG. 5 are allocated for the filesystem.

FIG. 6 is a schematic representation of the table 9025 as might be found at a particular point in time in an exemplary prior art embodiment, where information for each new chunk is stored in a separate table entry. For convenience and simplicity, the table is represented as storing a chunk pointer and a size, although in actual embodiments, the table may contain additional and/or alternate information for tracking the logical and physical addresses and devices associated with the chunks allocated to the filesystem (e.g., storing the beginning and ending addresses of chunks or runs of chunks allocated to the filesystem). When the filesystem is first created, the fields in the table 9025 are blank. As the file server 9002 allocates chunks to the filesystem, the address and size of each newly allocated chunk are stored in an entry's fields. The file server 9002 can allocate the three new chunks to the filesystem, thus occupying three entries in the table 9025. Information for the first chunk is written into table entry 9030, including a pointer to the start of the chunk (in this example, a pointer to the start of chunk "free 1") in a previously blank field 9040 and the chunk size X in field 9050; information for a second chunk is written into table entry 9031, including a pointer to the start of the chunk (in this example, a pointer to the start of chunk "free 2") in a previously blank field 9041 and the chunk size X in field 9051; and information for a third chunk is written into table entry 9032, including a pointer to the start of the chunk (in this example, a pointer to the start of chunk "free 3") in a previously blank field 9042 and the chunk size X in field 9052. The virtual filesystem address space is increased by 3X. In alternate embodiments, each allocated chunk may have the same size. In these embodiments, the table 9025 could include a single column, wherein each entry in the column stores the address of the beginning of a chunk.

FIG. 7 is a schematic representation of the table 9025 as might be found at a particular point in time in an exemplary embodiment where information for contiguous chunks may be stored in a single table entry, in lieu of the table 9025 shown in FIG. 6. Specifically, using the example above in which contiguous chunks "free 1," "free 2," and "free 3" from FIG. 5 are allocated for the filesystem, table entry 9030 is used to store information for the run of three contiguous chunks. A pointer to the start of the run (in this example, a pointer to the start of chunk "free 1") has been written into field 9040. A pointer to the end of the run (in this example, a pointer to the end of chunk "free 3")) has been written into field 9050. In this way, even though the span manager 9003 allocated three new chunks and added the chunks to the filesystem, the contiguous chunks take up only one table entry and are made to appear in the table 9025 as a single chunk of a larger chunk size (i.e., a chunk spanning the stored addresses).

For the sake of further demonstration, say that a further request is received for the span manager 9003 to expand the filesystem by two more chunks and that the span manager 9003 determines that it should allocate the next two contiguous chunks from the same stripeset (e.g., chunks "free 4" and "free 5" in FIG. 5).

FIG. 8 is a schematic representation of the table 9025 showing how the table entry 9030 of FIG. 7 is modified to incorporate the two additional contiguous chunks in accordance with one exemplary embodiment. Specifically, the pointer to the start of the first chunk in the run remains in field 9040, but the end address of the run, stored in field 9050, is changed (in this example, to the end of chunk "free 5") so that the disk space between the start and end addresses encompass the additional two contiguously-allocated chunks. In this way, even though the span manager 9003 has now allocated five contiguous chunks from storage and added the chunks to the filesystem, the contiguous chunks still take up only one table entry.

Figure 9:
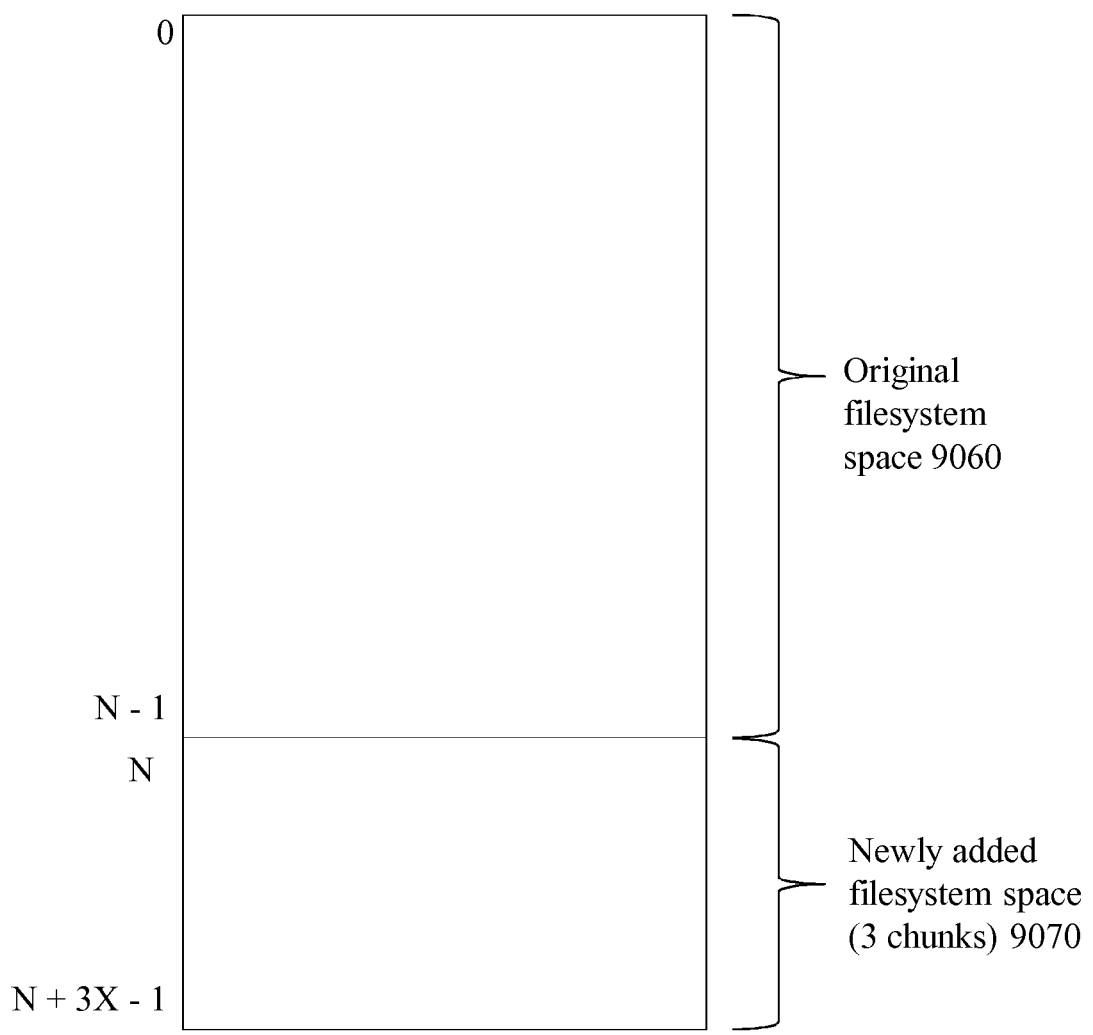
FIG. 9 is a schematic representation of the filesystem space of FIG. 4 expanded by three chunks of the same size (e.g., X), in accordance with one exemplary embodiment.

In typical embodiments, expansion of the filesystem using aggregated contiguous chunks is only done with the last used or unused table entry in the table 9025 so that the corresponding extension of the virtual filesystem address space maps to the new storage added to the end of the filesystem. For example, with reference again to FIG. 4, if three chunks are added to the filesystem, then the filesystem address space would increase from N to (N+3X) but the physical addresses corresponding to storage for blocks 0 to (N−1) must remain unchanged or else a particular virtual filesystem address might then point to an invalid physical address location. FIG. 9 is a schematic representation of the filesystem space of FIG. 4 expanded by three chunks of size X. The original filesystem space 9060 remains at logical address range 0 to (N−1) and the newly allocated filesystem space 9070 is at logical address range N to (N+3X−1).

Figure 10:
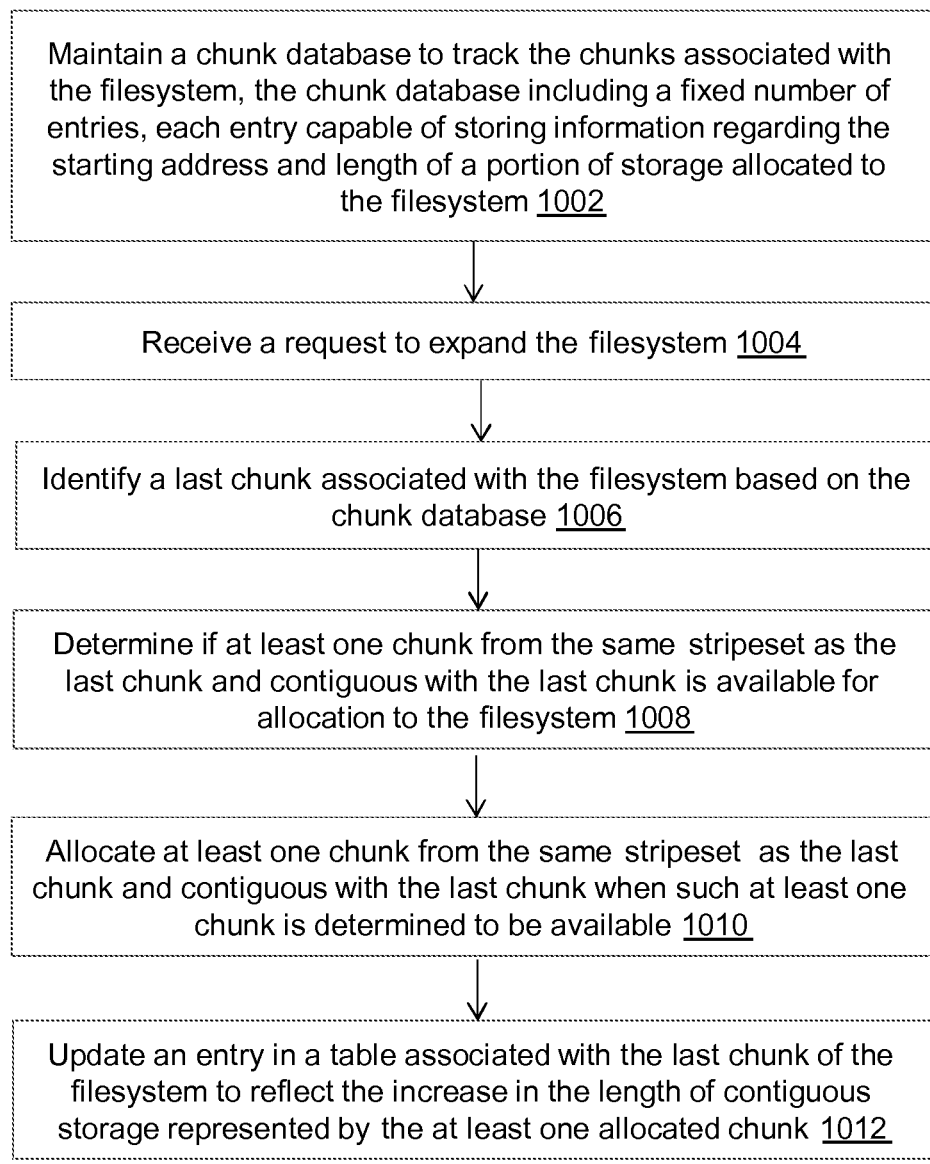
FIG. 10 is a flow chart for a generic chunk allocation process, in accordance with one exemplary embodiment.

FIG. 10 is a flow chart for a generic chunk allocation process, in accordance with one exemplary embodiment. Specifically, FIG. 10 describes a generic chunk allocation process for expanding storage for a filesystem by a file server, where the filesystem includes a plurality of chunks selected from a plurality of stripesets, and the file server maps a virtual address space of the filesystem to physical storage addresses associated with the chunks. Beginning in block 1002, the file server maintains a chunk database to track the chunks associated with the filesystem, the chunk database including a fixed number of entries, each entry capable of storing information regarding the starting address and length of a portion of storage allocated to the filesystem. In block 1004, the file server receives a request to expand the filesystem. In block 1006, the file server identifies a last chunk associated with the filesystem based on the chunk database. In block 1008, the file server determines if at least one chunk from the same stripeset as the last chunk and contiguous with the last chunk is available for allocation to the filesystem. In the context of the exemplary embodiments discussed herein, the determination of whether at least one chunk from the same stripeset as the last chunk and contiguous with the last chunk is "available" for allocation to the filesystem may take into account not just whether the chunk(s) is/are free but also other factors, such as run bias and other factors, as discussed below. In block 1010, the file server allocates at least one chunk from the same stripeset as the last chunk and contiguous with the last chunk when at least one chunk is determined to be available. In block 1012, the file server updates an entry in a table associated with the last chunk of the filesystem to reflect the increase in the length of contiguous storage represented by at least one allocated chunk.

In certain exemplary embodiments, various limitations (discussed more fully below) are placed on the number of contiguous chunks that can be allocated from a stripeset and associated with a single table entry, such that, in some situations, even if additional contiguous chunks could have been allocated from a particular stripeset and associated with a single table entry, at least some of the chunks are allocated from a different stripeset in order to distribute the storage (and hence the storage accesses) across multiple stripesets. For example, say that the last chunk in a particular filesystem is part of a run of A contiguous chunks from a particular stripeset (which may be referred to herein as the "active run length"), where A is greater than or equal to one but is less than the predetermined run bias. Also, say that a request is received to expand the filesystem by B chunks, where (A+B) is greater than the predetermined run bias. Even if there are B chunks available from the same stripeset as the last chunk and contiguous with the last chunk, the chunk allocator 9014 generally will allocate only N chunks from that stripeset, where N is equal to the run bias minus the active run length; the chunk allocator 9014 generally will allocate the remaining chunk(s) from one or more other stripesets as selected according to a predetermined selection scheme, discussed more fully below. However, in some embodiments, if the stripeset has been recently added to the span and is proportionally emptier than other stripesets, the chunk allocator 9014 may allocate long runs on the emptier stripeset, despite the length of the run bias.

While, in some exemplary embodiments, the chunk allocator 9014 may determine in real time whether one or more chunk(s) can be allocated from the same stripeset as the last chunk and contiguous with the last chunk, in certain exemplary embodiments, the chunk allocator 9014 may, under certain circumstances discussed more fully below, at least temporarily reserve one or more contiguous chunks from a stripeset in order to allow such chunks to be allocated to the filesystem in a contiguous manner at a future time. Specifically, under such circumstances, when the chunk allocator 9014 allocates one or more contiguous chunks from a stripeset to allocate to the filesystem and there is a possibility that additional contiguous chunks may be allocated to the filesystem in the future, the chunk allocator 9014 may reserve one or more chunks in that stripeset, contiguous with the chunk(s) that were allocated, so that such reserved chunks are available to allocate to the filesystem if and when the filesystem is expanded in the future. Generally speaking, the chunk allocator 9014 will only reserve chunk(s) to the extent that reserved chunk(s) can be allocated without exceeding a predetermined run bias, i.e., if the number of contiguous chunk(s) that have been allocated from the stripeset to the filesystem (which may be referred to herein as the "active run length") has reached the predetermined run bias, then the chunk allocator 9014 typically does not reserve any chunks; otherwise, the chunk allocator 9014 may reserve up to N chunks, where N is equal to the predetermined run bias minus the active run length. The chunk allocator 9014 avoids reserved chunks when allocating chunks for other filesystems, at least until the reserved chunks are returned to the "pool" of available chunks (e.g., if the reserved chunks become the only chunks that are available to be allocated). It should be noted that the chunk allocator 9014 may maintain a separate grouping of reserved chunks for each of a number of different filesystems.

Thus, as the filesystem's storage expands, the file server 9002 may allocate a chunk from a run reserved for the filesystem. Because a run with multiple chunks can occupy a single entry in the chunk database, filesystems thereby may include more chunks than chunk database would otherwise allow. Thus, in this system, storage may be used efficiently, filesystems may add storage in smaller increments, filesystems may be scalable, and address translation may be performed quickly.

Additionally, the file server 9002 may seek to distribute both the cumulative load of the filesystems and the individual load of each filesystem across the stripesets. When a filesystem requests a disk space expansion, the file server 9002 considers a number of factors to determine which stripeset to select for the next allocation of disk space. Exemplary factors for assessing a stripeset include the number of chunks that would need to be allocated on the stripeset to make the stripeset as proportionally full as the fullest stripeset and the number of chunks on the stripeset that are already being used by the filesystem.

In some embodiments, exemplary factors implement a priority of balancing the overall load over the stripesets over balancing a filesystem's load across the stripesets, or vice versa. When most or all of the filesystems on the span are expected to be busy, balancing the overall load across the stripesets may be the more important priority. When a small proportion of the filesystems are expected to be busy, at any given time or during peak times, balancing the load of each filesystem across the stripesets may become the priority. The relative importance of these goals can be implemented in weights applied to parameters to determine the stripeset from which disk space shall be allocated next. The weights may be a span weight and a filesystem weight. A larger span weight prioritizes balancing the overall load of the span across the stripesets, and the span weight is applied to a measure of the imbalance of chunk allocations across the stripesets (e.g., the number of chunks that would need to be allocated on the stripeset to make the stripeset as proportionally full as the fullest stripeset). A larger filesystem weight prioritizes balancing the load(s) of the active filesystem(s) across the stripesets, and the filesystem weight is applied to a measure of the imbalance of chunk allocations for a particular filesystem across the stripeset.

In some embodiments, the file server 9002 has a single chunk allocator 9014 that stores different values for the span and filesystem weights. In various embodiments, the file server 9002 has different chunk allocators 9014 may have different values for the span and filesystem weights, and a file server 9002 may select a chunk allocator 9014 to process a request for disk space expansion based on the client making the request, the filesystem being expanded, or any other variable. Based on at least the factors discussed herein, a chunk allocator 9014 on the file server 9002 selects either the stripeset that includes the last chunk allocated to the filesystem or a new stripeset.

When the chunk allocator 9014 selects the stripeset with the filesystem's last allocated chunk, the chunk allocator

9014, when possible, allocates the chunk that immediately follows the last chunk. When the chunk allocator 9014 selects a new stripeset, the chunk allocator 9014 allocates a chunk and also reserves a number of subsequent, consecutive chunks of disk space for future requests from the filesystem (e.g., the claimed run). Thus, when the filesystem requests additional disk space, the chunk allocator 9014 can allocate chunks from the disk space already set aside for it. Further, when the chunk allocator 9014 searches for disk space on a new stripeset, the chunk allocator 9014 may bypass available chunks that have already been reserved for other filesystems.

With respect to the number of consecutive chunks to reserve, the file server 9002 may determine a run bias for the span. Although the file server 9002 will allocate a number of chunks corresponding to the run bias, in some circumstances, the file server 9002 may allocate a different number, as described in more detail below.

Details of specific exemplary embodiments are now described. In these specific exemplary embodiments, the file server 9002 receives information regarding the relative importance of distributing a span's overall load across the stripesets compared with distributing the individual filesystems' loads across the stripesets. In some embodiments, the file server 9002 stores default values for the span weight and filesystem weight. In some embodiments, an administrator of the file server 9002 can input the span weight and the filesystem weight into the file server 9002. In some embodiments, the administrator inputs an individual and/or distinct filesystem weight for each filesystem in the span. In some embodiments, upon subscribing to the file server system or requesting a new filesystem, a client may input the span and/or filesystem weights for storage by the file server 9002. The file server 9002 may store the weights in a chunk allocator 9014. In some embodiments, the file server 9002 stores the weights in a span configuration-on-disk (e.g., Cod).

In various embodiments, values of the weights can range between zero (0) and ten (10). The default value of the span weight and/or the filesystem weight may be 10. In some implementations, if the client does not provide information regarding priorities for load distribution, the file server 9002 sets the span weight and filesystem weight to the same value. This value may be ten (10), five (5), or any other value desired by one of ordinary skill in the art.

The file server 9002 determines a run bias for the span. In some embodiments, the file server 9002 uses a run bias input by a client for the client's span and/or filesystems. In some embodiments, the file server 9002 uses a default value stored in memory. A default run bias may be 64 chunks, although other default values may be used.

In some embodiments, the file server 9002 determines a run bias based on the number of filesystems and the number of stripesets on the span. For example, when the span has few chunks and many stripesets, a smaller run bias may improve load balancing across the stripesets. The file server 9002 may reduce the run bias according to the span's parameters.

In some embodiments, the file server 9002 may divide the number of stripesets by 2. The file server 9002 may divide the resulting value by the number of filesystems. The file server 9002 may compare the resulting value with a default run bias stored in memory and set the run bias to the smaller value. In some embodiments, the run bias for a span can be between 0 chunks and 250 chunks, although other ranges for potential values of the run bias may be used.

In operation, a user at a client device 9006 sends to the file server 9002 a request to expand disk space for a filesystem. In some embodiments, the request includes the amount of disk space to add to the filesystem. The file server 9002 determines the number of chunks corresponding to the amount of disk space by, for example, dividing the amount of requested disk space by the guideline size of the chunk.

When a request is received to expand a filesystem, the chunk allocator 9014 selects one or more stripesets for the allocation of chunks to the filesystem. As described above, the chunk allocator 9014 may reserve runs on the stripesets for the filesystems. For this reason, when the chunk allocator 9014 determines a stripeset for the next allocation to a filesystem, the chunk allocator 9014 may have a bias towards the stripeset that includes the filesystem's most recently allocated chunk (also referred to herein as the "current stripeset"). In some situations, the chunk allocator 9014 nevertheless selects a new stripeset for the allocation. The chunk allocator 9014 may change to another stripeset to balance the overall load of the span, to balance the filesystem load across the stripesets, or for any other reason.

In some embodiments, the chunk allocator 9014 selects a stripeset based on at least the number of chunks that would need to be allocated on a stripeset to make the stripeset as proportionally full as the fullest stripeset, the number of used chunks on a stripeset that have been allocated to the filesystem being expanded, the span weight, and the file system weight. If the chunk allocator 9014 determines that remaining on the current stripeset may be advantageous, when selecting the stripeset, the chunk allocator 9014 may bias its selection by adding a bias factor to the number of available chunks on the current stripeset.

In some embodiments, the chunk allocator 9014 may use various criteria to determine whether to bias the selection of the stripeset towards the current stripeset. For example, the chunk allocator 9014 may bias the selection only if the filesystem already has at least one allocated chunk, thereby having a current stripeset, and the chunk after the filesystem's last allocated chunk is available, so that the allocator is always biased towards using the next chunk and avoiding the need to start a new run. When a filesystem is first created, because the filesystem does not yet have a load to distribute across the stripesets, the chunk allocator 9014 may be concerned primarily with distributing the overall load of the span. In another example, the chunk allocator 9014 may bias the selection if the chunk that immediately follows the filesystem's last allocated chunk is available. If this chunk is unavailable, then the filesystem has presumably expanded into the entire run of chunks reserved for it. Since the next allocation requires a new entry in the table, remaining on the current stripeset is not necessarily advantageous. In some embodiments, the file server 9002 may require one or more of these conditions before biasing the selection.

The bias factor may be determined in any of a number of ways. In some embodiments, the chunk allocator 9014 determines the number of chunks to allocate to the filesystem being expanded. For example, the chunk allocator 9014 may divide the size of the allocation requested by the filesystem by the guideline size of a chunk. The chunk allocator 9014 may determine the number of chunks that may be allocated on the current stripeset. For example, the chunk allocator 9014 may divide the number of chunks in the expansion by the number of stripesets that still have disk space that can be allocated.

The chunk allocator 9014 may compute a bias factor that accounts for the desirability of placing large runs contiguously on disk and avoiding fragmenting runs when the span has many filesystems. To account for the former, the chunk allocator 9014 may determine the larger of the run bias compared with the number of chunks that may be allocated on the current stripeset (also referred to herein as the "contiguous factor"). To account for the latter, the file server 9002 may divide the number of filesystems by the number of stripesets. If this quotient is larger than one, the bias factor may be this quotient multiplied by the contiguous factor. Otherwise, the bias factor may be equal to the contiguous factor.

To select the stripeset, the chunk allocator 9014 scores each stripeset and selects the stripeset with the highest score. The score may include a span subscore and a filesystem subscore. In some embodiments, the score may be the sum of the span subscore and the filesystem subscore. For the span subscore, the chunk allocator 9014 may first determine the number of chunks that would need to be allocated on the stripeset to make the stripeset as proportionally full as the fullest stripeset. In some embodiments, the span subscore may be the product of the span weight and the number of chunks that would need to be allocated on the stripeset to make the stripeset as proportionally full as the fullest stripeset. Thus, part of the stripeset's score may account for the stripeset's availability, with respect to other stripesets, to assume the span's load.

For the filesystem subscore, the chunk allocator 9014 may determine the number of chunks on the stripeset already allocated to the filesystem. The filesystem subscore may be the product of the filesystem weight and this number of chunks. Thus, part of the stripeset's score may account for the number of chunks that would need to be allocated to the stripeset to make it as full as the fullest stripeset.

In some embodiments, when the file server 9002 is not biasing the selection towards the current stripeset, the chunk allocator 9014 may account for the chunks that already have been reserved for other filesystems when the chunk allocator 9014 determines the number of available chunks on a stripeset. For example, if any of the other filesystems has a live run on the stripeset, the chunk allocator 9014 may determine the number of chunks that would need to be appended to the live run for the run length to equal the run bias. The chunk allocator 9014 may subtract this number from the total number of available chunks on the stripeset. The final number may be multiplied by the span weight to determine the stripeset's span subscore. The chunk allocator 9014 then determines the stripeset's filesystem score and total score. The chunk allocator 9014 selects the stripeset with the highest score.

In some embodiments, when the file server 9002 is biasing the selection towards the current stripeset, the number of available chunks on a stripeset may be the total number of unallocated chunks. Further, the chunk allocator 9014 may add the bias factor to the number of available chunks on the current stripeset. If the current stripeset has the highest score or ties for the highest score, the chunk allocator 9014 selects the current stripeset. Otherwise, the chunk allocator 9014 recalculates the scores as if the chunk allocator 9014 were not biasing the selection and selects the stripeset with the highest score.

In some embodiments, when the chunk allocator 9014 selects the first chunk for a new filesystem, the chunk allocator 9014 selects a stripeset that is hosted on more than one SD. In many embodiments, the first chunk of a filesystem includes information regarding the structure of the filesystem (e.g., metadata). By selecting a stripeset hosted on more than one SD, the chunk allocator 9014 redundantly stores such critical information to ensure at least one copy is accessible if another copy fails. In some embodiments, the chunk allocator 9014 excludes all stripesets on a single SD when selecting a stripeset. In some embodiments, if none of the multi-SD stripesets have any free chunks, the chunk allocator 9014 returns to considering single-SD stripesets.

The chunk allocator 9014 selects one or more chunks on the selected stripeset to allocate to the filesystem. If the chunk allocator 9014 selects the current stripeset, the chunk allocator 9014 may determine if the chunk that immediately follows the last allocated chunk of the filesystem is available. If so, the chunk allocator 9014 allocates that chunk to the filesystem.

When the chunk allocator 9014 selects a new stripeset, the chunk allocator 9014 may search for a run of unreserved chunks and allocate the first chunk therein to the filesystem. The chunk allocator 9014 may search for a run of unreserved chunks whose length is at least the run bias. If the chunk allocator 9014 finds such a run, the file server 9002 may allocate the first chunk in the run to the filesystem. The chunk allocator 9014 may search for the longest run of unreserved chunks on the stripeset and allocate the first chunk in this run to the filesystem.

In some situations, the chunk allocator 9014 may be unable to find a run of unreserved chunks with a desired length, such as the run bias. In these situations, the chunk allocator 9014 may search for claimed runs (e.g., unallocated runs that are reserved for other filesystems). In some embodiments, the chunk allocator 9014 may search for a claimed run whose length is equal to the run bias. The chunk allocator 9014 may allocate the first chunk in the second half of the claimed run to the filesystem. In some embodiments, if the filesystem has requested an expansion of disk space that requires more than half the chunks in the claimed run, the chunk allocator 9014 identifies the chunk within the first half of the claimed run such that allocation of the requested chunks would fill the latter portion of the claimed run. In this manner, the file server 9002 may retain some scalability for the filesystems even as available disk space becomes scarce. If the chunk allocator 9014 cannot find a claimed run with a length equal to the run bias, the chunk allocator 9014 may search for the longest claimed run on the stripeset and allocate its first chunk to the filesystem.

In some embodiments, if the chunk allocator 9014 cannot find a chunk to allocate, the allocation may fail. The file server 9002 may return an error message to the client 9006.

In some embodiments, instead of searching for runs with lengths equal to the run bias, the chunk allocator 9014 may search for runs equal to the number of chunks for the filesystem expected to be allocated on the stripeset. As described above, this number may be the total number of chunks to be allocated to the filesystem divided by the number of non-full stripesets. In some embodiments, the chunk allocator 9014 searches according to this length when the length exceeds the run bias for the span.

In some situations, the request for disk space expansion for a filesystem includes an indication of the stripeset from which the disk space should be allocated. If the stripeset is not the filesystem's current stripeset, the chunk allocator 9014 may search for a chunk according to any of the methods described herein.

If the stripeset is the filesystem's current stripeset, the chunk allocator 9014 may allocate the chunk immediately after the live run. If the expansion requires more than one chunk, the chunk allocator 9014 may continue allocating chunks until the length of the run equals the run bias. In some embodiments, if the chunk after the live run is available, the chunk allocator 9014 may expand the run beyond the run bias. In some embodiments, for the remaining chunks in the expansion, the chunk allocator 9014 may search for disk space according to any of the other methods described herein.

In some situations, the request from the user includes a request for a large expansion of disk space. To distribute the new load across the span, the chunk allocator 9014 may allocate chunks from each stripeset with available chunks to the filesystem. In some embodiments, the chunk allocator 9014 may divide the number of chunks in the request by the number of non-full stripesets. The chunk allocator 9014 may search each stripeset for an unclaimed run whose length is equal to the quotient, and each run may occupy a single entry in the filesystem's table. In some situations, the chunk allocator 9014 may allocate on each stripeset a run whose length is longer than the run bias. In some embodiments, if the quotient is smaller than the run bias, the chunk allocator 9014 may select a stripeset according to any of the methods described herein and allocate a run of chunks equal to the run bias. The chunk allocator 9014 may continue selecting stripesets and allocating chunks of the run bias until all the disk space in the request has been allocated to the filesystem.

Figure 11:
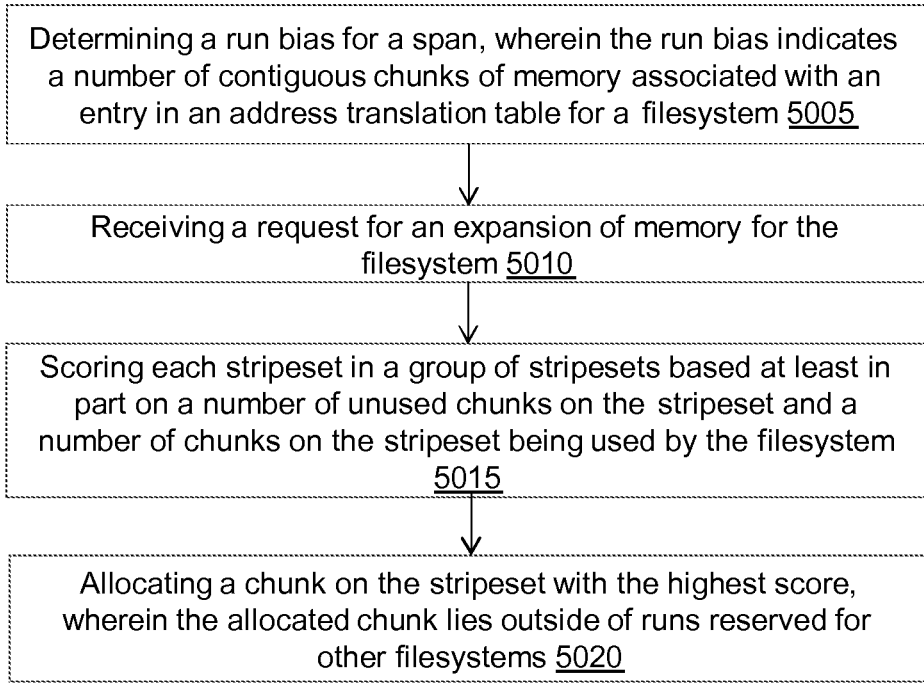
FIG. 11 is an exemplary flow diagram of a method of selecting a stripeset and chunk on the stripeset to allocate to a filesystem.

Referring now to FIG. 11, an exemplary flow diagram of a method of selecting a stripeset and chunk on the stripeset to allocate to a filesystem is shown and described. The method includes determining a run bias for a span, wherein the run bias indicates a number of contiguous chunks of disk space associated with an entry in an address translation table for a filesystem (step 5005). When the chunk allocator has allocated to a file system a number of contiguous chunks of disk space on a stripeset equal to the run bias, the chunk allocator can determine a new stripeset to provide the disk space expansion. In some embodiments, the file server can retrieve a default run bias stored in memory. In some embodiments, the file server determines a potential run bias based on the number of stripesets and the number of filesystems. For example, the file system can divide the number of stripesets by 2 and divide the resulting value by the number of filesystems. If the result is smaller than the default run bias, the result can become the run bias.

The method includes receiving a request for an expansion of disk space for the filesystem (step 5010). In some embodiments, the file server retrieves a span weight and a filesystem weight based on the filesystem requesting the expansion of disk space. In some embodiments, the single chunk allocator of the file server retrieves a span weight and a filesystem weight. In other embodiments, the file server selects a chunk allocator from a plurality of chunk allocators based on the filesystem. In these embodiments, each chunk allocator can store a unique pair of span and filesystem weights.

The method includes scoring each stripeset in a group of stripesets based at least in part on a number of unused chunks on the stripeset and a number of chunks on the stripeset being used by the filesystem (step 5015). For each stripeset, the chunk allocator can multiply the span weight by the number of chunks that would need to be allocated on the stripeset to make the stripeset as proportionally full as the fullest stripeset. For each stripeset, the chunk allocator can also multiply the filesystem weight by the number of chunks on the stripeset being used by the filesystem. The chunk allocator can set the score for the stripeset equal to the sum of these two products. In some embodiments, the chunk allocator can include a bias factor when determining the score for the current stripeset. In some embodiments, the number of unused chunks on the stripeset can account for the unallocated chunks of disk space that are reserved for other filesystems.

The method includes allocating a chunk on the stripeset with the highest score, wherein the allocated chunk lies outside of runs reserved for other filesystems (step 5020). If the current stripeset of the filesystem has the highest score, the chunk allocator can allocate a chunk subsequent to the last allocated chunk of the filesystem. In some embodiments, the chunk allocator may search for a run of unreserved chunks and allocate the first chunk therein to the filesystem. The chunk allocator may search for a run of unreserved chunks whose length is at least the run bias and allocate the first chunk in the run to the filesystem. The chunk allocator may search for the longest run of unreserved chunks on the stripeset and allocate the first chunk in this run to the filesystem.

In some embodiments, the chunk allocator can search for claimed runs whose length is equal to the run bias. The chunk allocator may allocate the first chunk in the second half of the claimed run to the filesystem, or any other chunk in the claimed run as described by other methods described herein. In some embodiments, the chunk allocator can search for the longest claimed run on the stripeset and allocated its first chunk to the filesystem.

Figure 12:
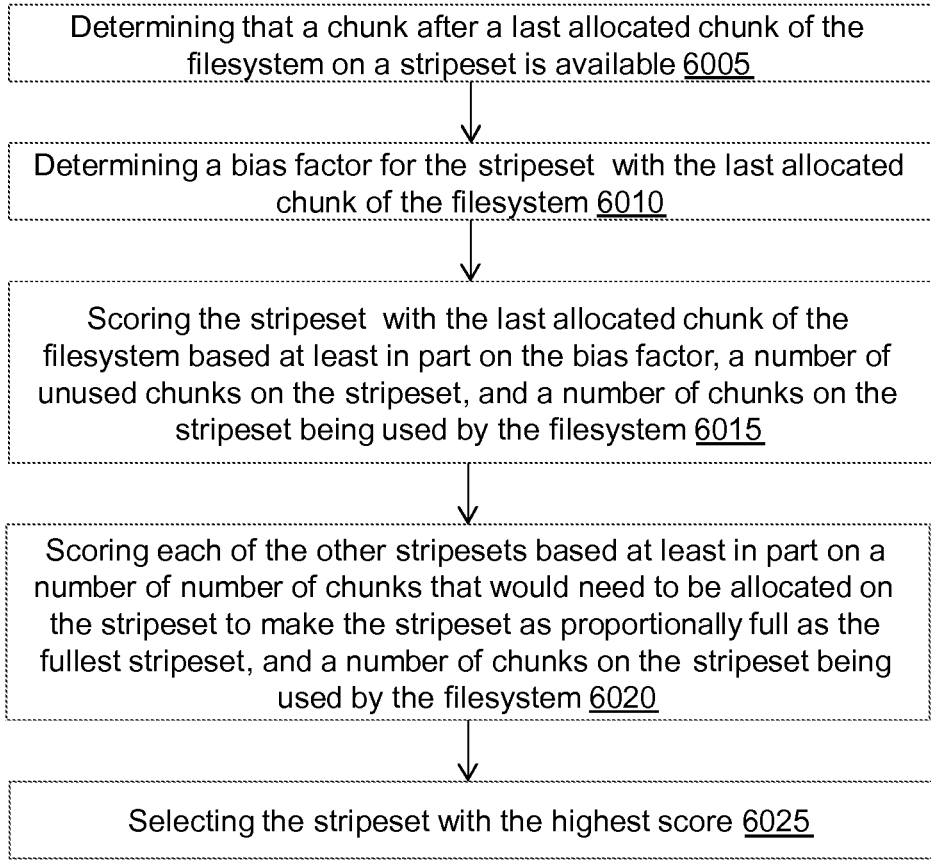
FIG. 12 is an exemplary flow diagram of a method of selecting a stripeset from which a chunk will be allocated when the current stripeset includes an expandable live run for the filesystem is shown and described.

Referring now to FIG. 12, an exemplary flow diagram of a method of selecting a stripeset from which a chunk will be allocated when the current stripeset includes an expandable live run for the filesystem is shown and described. The method includes determining that a chunk after a last allocated chunk of the filesystem on a stripeset is available (step 6005). The chunk allocator can locate the last allocated chunk of the filesystem and determine if the subsequent chunk is available. In some embodiments, the chunk allocator can determine that the length of the live run of the filesystem does not equal the run bias.

The method includes determining a bias factor for the stripeset with the last allocated chunk of the filesystem (step 6010). In some embodiments, the chunk allocator first determines the number of chunks to allocate to the filesystem being expanded by, for example, dividing the size of the allocation requested by the filesystem by the guideline size of a chunk. The chunk allocator can determine the number of chunks that may be allocated on the current stripeset by, for example, dividing the number of chunks in the expansion by the number of stripesets that still have disk space that can be allocated.

The bias factor can account for the desirability of placing large runs contiguously in disk space and avoiding fragmenting runs when the span has many filesystems. To account for the former, the chunk allocator can determine the larger of the run bias compared with the number of chunks that may be allocated on the current stripeset (also referred to herein as the contiguous factor). To account for the latter, the file server can divide the number of filesystems by the number of stripesets. If this quotient is larger than one, the bias factor can be this quotient multiplied by the contiguous factor. Otherwise, the bias factor can be equal to the contiguous factor.

The method can include scoring the stripeset with the last allocated chunk of the filesystem based at least in part on the bias factor, a number of chunks that would need to be allocated on the stripeset to make the stripeset as proportionally full as the fullest stripeset, and/or a number of chunks on the stripeset being used by the filesystem (step 6015). The chunk allocator can add the bias factor to the number of available chunks on the stripeset. The chunk allocator can multiply this number by the span weight and the number of chunks on the stripeset being used by the filesystem by the filesystem weight. The sum of these two products can be the current stripeset's score.

The method can include scoring each of the other stripesets based at least in part on a number of chunks that would need to be allocated on the stripeset to make the stripeset as proportionally full as the fullest stripeset, and/or a number of chunks on the stripeset being used by the filesystem (step 6020). For each stripeset, the chunk allocator can multiply the span weight by the number of chunks that would need to be allocated on the stripeset to make the stripeset as proportionally full as the fullest stripeset, and the filesystem weight by the number of chunks on the stripeset being used by the filesystem. The sum of these two products can be the stripeset's score.

The method can include selecting the stripeset with the highest score (step 6025). If the current stripeset has the highest score or ties for the highest score, the file server selects the current stripeset. Otherwise, the file server can recalculates the scores as if the file server were not biasing the selection towards the current stripeset, as described herein, and selects the stripeset with the highest score.

Figure 13:
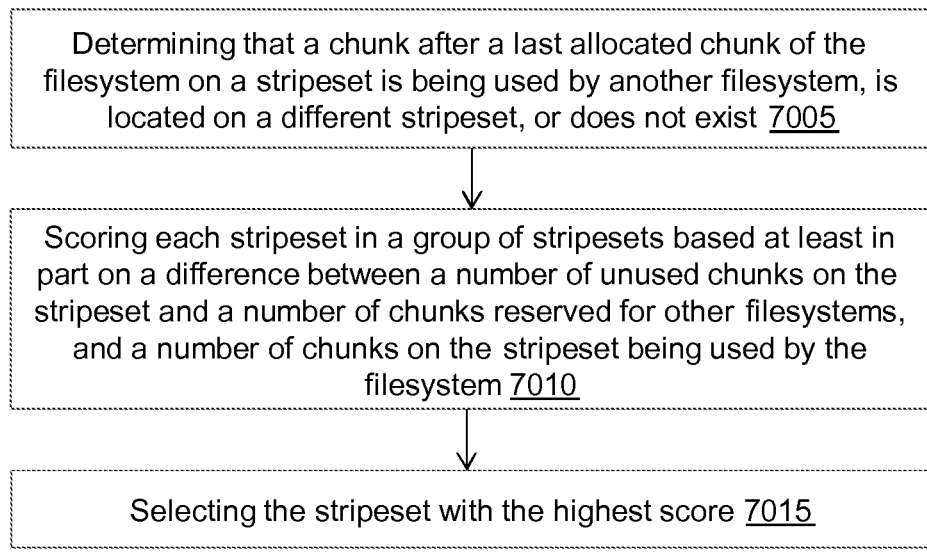
FIG. 13 is an exemplary flow diagram of a method of selecting a stripeset from which a chunk will be allocated when the current stripeset does not include an expandable live run for the filesystem is shown and described.

Referring now to FIG. 13, an exemplary flow diagram of a method of selecting a stripeset when the current stripeset does not include an expandable live run for the filesystem is shown and described. The method includes determining that a chunk after a last allocated chunk of the filesystem on a stripeset is being used by another filesystem, is located on a different stripeset, or does not exist (step 7005). The chunk allocator can locate the last allocated chunk of the filesystem and determine if the subsequent chunk is available. In some embodiments, the chunk allocator can determine that this chunk has already been allocated to another filesystem. In some embodiments, the chunk allocator can determine that the last allocated chunk of the filesystem is the last chunk on the stripeset, such that the next chunk does not exist. In some embodiments, the chunk allocator can determine that the next chunk is on a different stripeset.

The method includes scoring each stripeset in a group of stripesets based at least in part on a difference between the number of chunks that would need to be allocated on the stripeset to make the stripeset as proportionally full as the fullest stripeset and a number of chunks reserved for other filesystems, and a number of chunks on the stripeset being used by the filesystem (step 7010). For each stripeset, the file server can determine the number of unused chunks and a number of chunks reserved for filesystems. The file server can subtract the number of reserved chunks from the number of unused chunks, and multiply this difference by the span weight. The file server can multiply the number of chunks on the stripeset being used by the filesystem by the filesystem weight. The sum of the products will be the score of the stripeset.

The method includes selecting the stripeset with the highest score (step 7015). The file server compares the scores of the stripesets and selects the one with the highest score.

Figure 14:
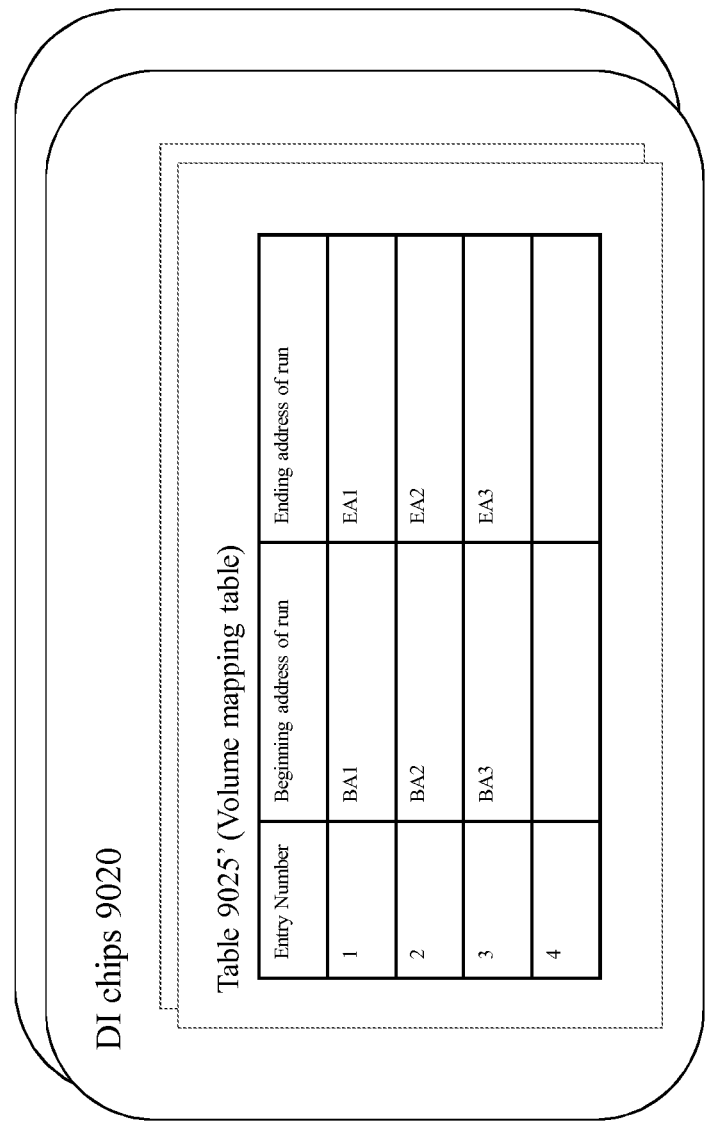
FIG. 14 is an exemplary table that stores the beginning and ending addresses in a filesystem space of runs allocated to a filesystem.

Referring now to FIG. 14, an exemplary table 9025' that stores the starting and ending addresses in a filesystem space of runs allocated to a filesystem is shown and described. The table 9025' is on a DI chip, such as DI chip 9020. The exemplary table 9025' is a volume mapping table. In an exemplary embodiment, the volume mapping table for a filesystem has an associated stripeset mapping table (not shown, for convenience) that is also stored on the DI chip. An entry in the volume mapping table stores addresses in the filesystem space for a run. The corresponding entry in the stripeset mapping table stores locations on the SDs to which the addresses in the filesystem space map.

In one exemplary use of the table 9052' the span has a default run bias of 64 chunks and the file server 9002 has selected the default run bias for its run bias. The table 9025' has three entries and each entry stores the location in the filesystem space of a run of chunks allocated to the filesystem. For the first run, the chunk allocator 9014 selected a stripeset and searched for an unclaimed run of 16 chunks. The chunk allocator 9014 selected and stored a beginning address BA1 for the first chunk in the unclaimed run, in the first entry in the table. The chunk allocator 9014 also stored the last address EA1 of this chunk in the table entry, signifying the end of the live run. As the filesystem requested additional expansions of disk space, the chunk allocator 9014 allocated successive chunks after EA1 and updated the stored ending address EA1 of the run until the filespace between BA1 and EA1 corresponded to 16 contiguous chunks of disk space that had been allocated to the filesystem.

The next time the filesystem requested an expansion of disk space, the chunk allocator 9014 selected a stripeset and searched for another unclaimed run of 16 chunks. The chunk allocator 9014 selected and stored a beginning address BA2 and ending address EA2 for the first chunk in this next unclaimed run, in the second entry in the table. Again, the chunk allocator 9014 allocated successive chunks after EA2 and updated the stored ending address EA2 of the run until the filespace between BA2 and EA2 corresponded to 16 contiguous chunks of disk space that had been allocated to the filesystem.

For the next expansion of disk space, the chunk allocator 9014 again selected a stripeset and searched for an unclaimed run of 16 chunks. The chunk allocator 9014 selected and stored a beginning address BA3 and ending address EA3 for the first chunk in this next unclaimed run, in the third entry in the table. Again, the chunk allocator 9014 allocated successive chunks after EA3 and updated the stored ending address EA3 of the run until the filespace between BA3 and EA3 corresponded to 16 contiguous chunks of disk space that had been allocated to the filesystem. In another exemplary use of the table 9052', the span has three stripesets and a default run bias of 16 chunks. The filesystem has requested a large allocation of disk space that is equal to 300 chunks. To balance the load across the span, the chunk allocator 9014 attempts to allocate 100 chunks to each of the three stripesets. In this embodiment, the chunk allocator 9014 searches each stripeset for an unclaimed run of 100 chunks. The chunk allocator 9014 finds an unclaimed run of 100 chunks on the first stripeset between addresses BA1 and EA1. The chunk allocator 9014 allocates these 100 chunks to the filesystem and stores the addresses BA1 and EA1 in the first entry of the table 9025'.

The chunk allocator 9014 finds an unclaimed run of 100 chunks on the second stripeset between addresses BA2 and EA2. The chunk allocator 9014 allocates these 100 chunks to the filesystem and stores the addresses BA2 and EA2 in the second entry of the table 9025'. The chunk allocator 9014 finds an unclaimed run of 100 chunks on the third stripeset between addresses BA3 and EA3. The chunk allocator 9014 allocates these 100 chunks to the filesystem and stores the addresses BA3 and EA3 in the third entry of the table 9025". In this manner, despite the run bias of 16 chunks, the chunk allocator 9014 is capable of allocating longer runs to distribute a large allocation of disk space across the span while using as few additional table entries as possible.

Figure 15:
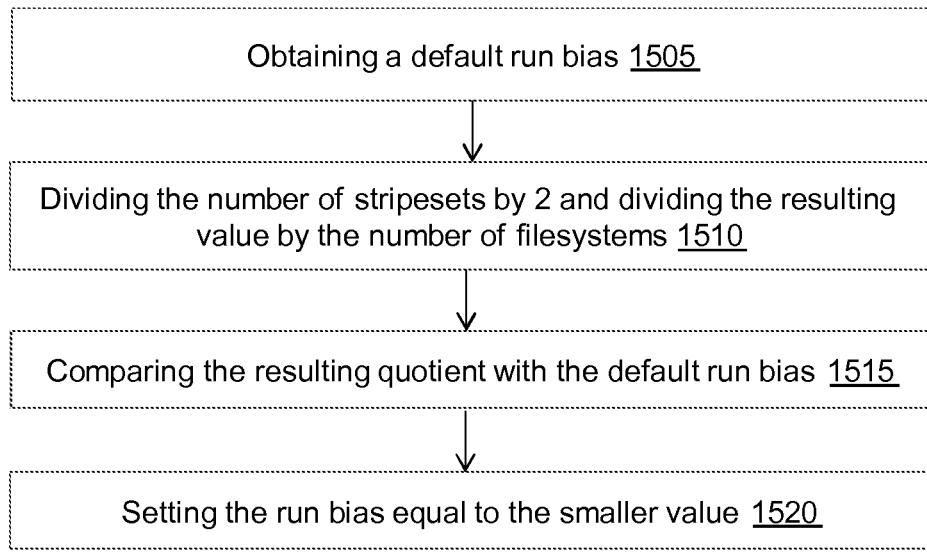
FIG. 15 is an exemplary flow diagram for a method of reducing a run bias to improve load balancing across a span.

Referring now to FIG. 15, an exemplary flow diagram for a method of reducing a run bias to improve load balancing across a span is shown and described. The method includes obtaining a default run bias (step 1505). In some embodiment, the file server 9002 retrieves from memory a default run bias input by a user of the data storage system. In other embodiments, the file server 9002 retrieves from memory a default run bias set by an administrator of the span. The method includes dividing the number of stripesets by 2 and dividing the resulting value by the number of filesystems (step 1510). The method includes comparing the resulting quotient with the default run bias (step 1515). The method includes setting the run bias equal to the smaller value (step 1520).

Figure 16:
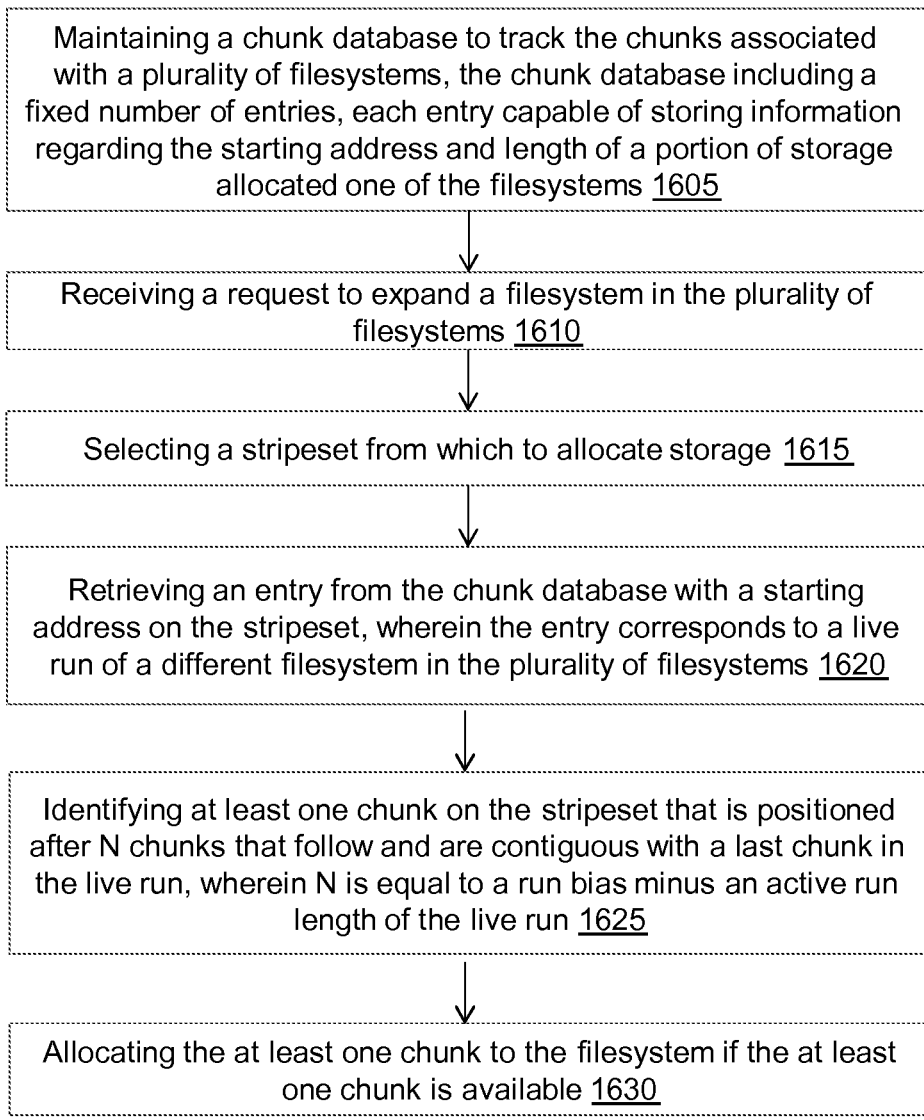
FIG. 16 is an exemplary flow diagram for a method of searching for unreserved chunks on a stripeset to allocate to a filesystem.

Referring now to FIG. 16, an exemplary flow diagram for a method of searching for unreserved chunks on a stripeset to allocate to a filesystem is shown and described. The method includes maintaining a chunk database to track the chunks associated with a plurality of filesystems, the chunk database including a fixed number of entries, each entry capable of storing information regarding the starting address and length of a portion of storage allocated one of the filesystems (step 1605). The method includes receiving a request to expand a filesystem in the plurality of filesystems (step 1610). The method includes selecting a stripeset from which to allocate storage (step 1615). The method includes retrieving an entry from the chunk database with a starting address on the stripeset, wherein the entry corresponds to a live run of a different filesystem in the plurality of filesystems (step 1620). The method includes identifying at least one chunk on the stripeset that is positioned after N chunks that follow and are contiguous with a last chunk in the live run, wherein N is equal to a run bias minus an active run length of the live run (step 1625). The method includes allocating the at least one chunk to the filesystem if the at least one chunk is available (step 1630).

Figure 17:
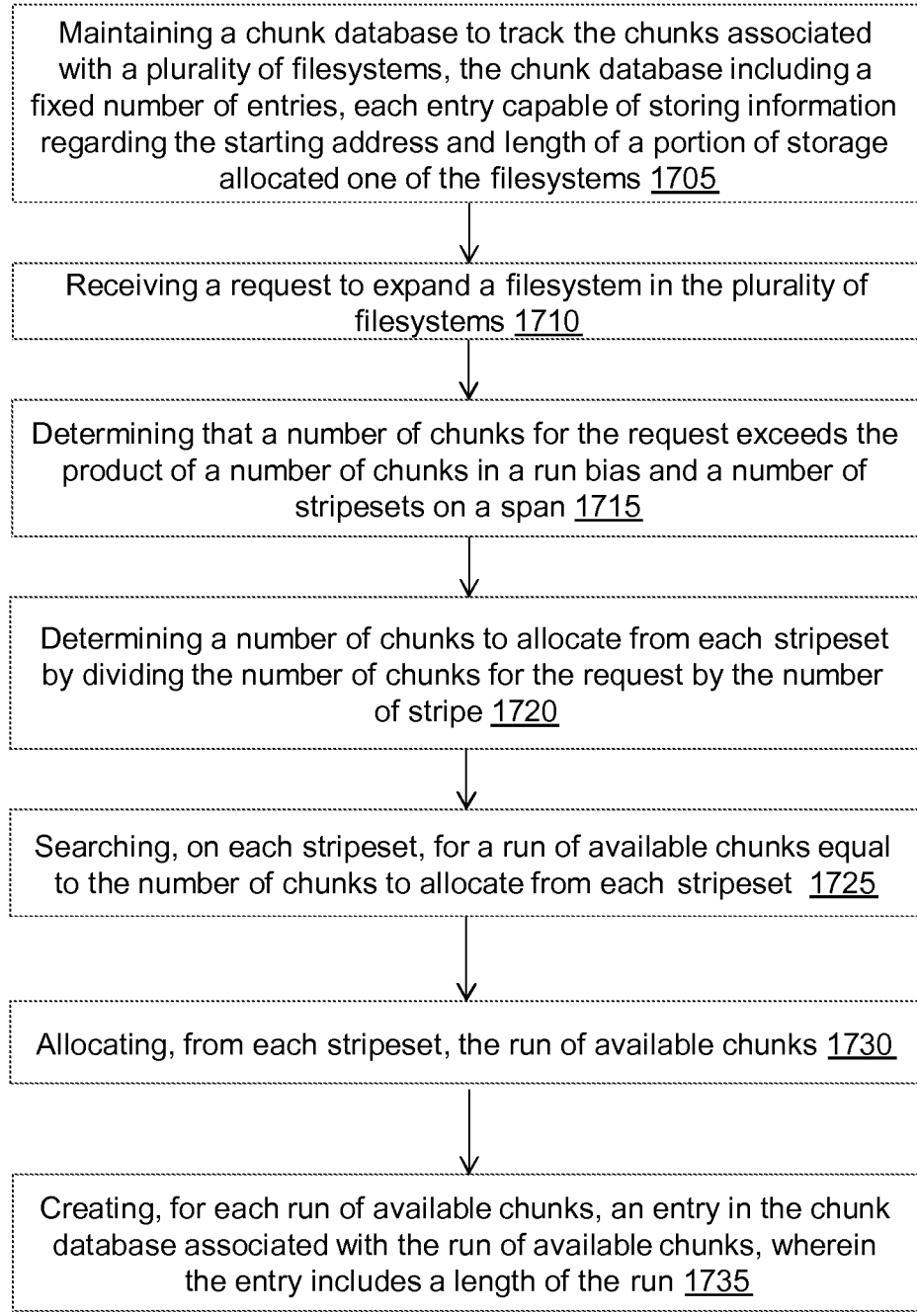
FIG. 17 is an exemplary flow diagram for a method of allocating storage across all the stripesets in a span.

Referring now to FIG. 17, an exemplary flow diagram for a method of expanding storage for a filesystem by a file server, the filesystem including a plurality of chunks selected from a plurality of stripesets, the file server mapping a virtual address space of the filesystem to physical storage addresses associated with the chunks by the file server, is shown and described.

The method includes maintaining a chunk database to track the chunks associated with a plurality of filesystems, the chunk database including a fixed number of entries, each entry capable of storing information regarding the starting address and length of a portion of storage allocated one of the filesystems (step 1705). The method includes receiving a request to expand a filesystem in the plurality of filesystems (step 1710). The method includes determining that a number of chunks for the request exceeds the product of a number of chunks in a run bias and a number of stripesets on a span (step 1715). The method includes determining a number of chunks to allocate from each stripeset by dividing the number of chunks for the request by the number of stripesets (step 1720). The method includes searching, on each stripeset, for a run of available chunks equal to the number of chunks to allocate from each stripeset (step 1725). The method includes allocating, from each stripeset, the run of available chunks (step 1730). The method includes creating, for each run of available chunks, an entry in the chunk database associated with the run of available chunks, wherein the entry includes a length of the run (step 1735).

In the exemplary embodiments described above, a run bias may be used to limit the run lengths of chunks allocated to the filesystems. Thus, while the exemplary embodiments described above generally allow a larger number of chunks to be allocated to a filesystem based on the fixed length chunk database, the run bias still may effectively limit how much the filesystem can be expanded, e.g., rather than the filesystem being limited to X chunks, where X is the number of entries in the chunk database, the filesystem may be effectively limited to (run bias*X) chunks in certain embodiments. Thus, in various alternative embodiments, the run bias limitation (and the way the run bias is applied and the way chunks are reserved) may be modified to allow for longer run lengths when the filesystem is at or near its last chunk database entry. As but one example, when the filesystem is at its last chunk database entry, the run bias may be increased or eliminated completely for the filesystem in order to allow the filesystem to continue to expand, and in conjunction with such increase or elimination of the run bias, a larger number of contiguous chunks may be reserved, e.g., a predetermined maximum number of chunks or a predetermined percentage increase of the filesystem (e.g., the number of chunks that would be needed to expand the filesystem by the predetermined percentage).

It should be noted that the term "server" is used herein to describe a device that may be used in a communication system and should not be construed to limit the present invention to any particular type of device. Thus, embodiments of the present invention may be implemented in a client, server, computer, switch, or other type of communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in an appropriate programming language (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P16. A method of expanding storage for filesystems in a fine-grained, scalable manner, the method comprising:
  determining, by a file server, a run bias for a span, wherein the run bias indicates a number of contiguous chunks of memory associated with an entry in an address translation table for a filesystem;
  receiving, by the file server, a request for an expansion of memory for the filesystem;
  scoring, by the chunk allocator, each stripeset in a group of stripesets based at least in part on a number of unused chunks in the stripeset and a number of chunks on the stripeset being used by the filesystem; and
  allocating, by the chunk allocator, a chunk on the stripeset with the highest score, wherein the allocated chunk lies outside of runs reserved for other filesystems.

P17. The method of claim P16, wherein determining the run bias for a span comprises:
  determining, by the file server, a default run bias.

P18. The method of claim P16, wherein determining the run bias for a span comprises:
  determining, by the file server, the run bias based on a number of stripesets and a number of filesystems.

P19. The method of claim P16, wherein scoring each stripeset further comprises:
  determining, by the chunk allocator, that a chunk after a last allocated chunk of the filesystem is available;
  determining, by the chunk allocator, a bias factor for a current stripeset of the filesystem, wherein the current stripeset includes the last allocated chunk of the filesystem; and
  scoring, by the chunk allocator, the current stripeset with the bias factor.

P20. The method of claim P16, wherein scoring each stripeset further comprises:
  determining, by the chunk allocator, that a chunk after a last allocated chunk of the filesystem is used by another filesystem; and
  scoring, by the chunk allocator, each stripeset in a group of stripesets based at least in part on a difference between a number of unused chunks on the stripeset and a number of chunks reserved for other filesystems.

P21. The method of claim P16, wherein scoring each stripeset further comprises:
  scoring, by the chunk allocator, each stripeset in the group of stripesets based at least in part on a number of unused chunks on the stripeset, a span weight, a number of chunks on the stripeset being used by the filesystem, and a filesystem weight.

P22. The method of claim P16, where allocating the chunk on the stripeset with the highest score comprises:
  selecting, by the chunk allocator, a chunk after a last allocated chunk of the filesystem.

P23. The method of claim P16, where allocating the chunk on the stripeset with the highest score comprises:
  searching, by the chunk allocator, for a run of unreserved chunks whose length is at least the run bias; and
  selecting, by the chunk allocator, a first chunk in the run.

P24. The method of claim P16, where allocating the chunk on the stripeset with the highest score comprises:
  searching, by the chunk allocator, for a run of reserved chunks whose length is at least the run bias; and
  selecting, by the chunk allocator, a first chunk in a second half of the run.

P25. A data storage system comprising:
  a file server comprising a chunk allocator, wherein the file server is configured to determine a run bias for a span, wherein the run bias indicates a number of contiguous chunks of memory associated with an entry in an address translation table for a filesystem; and
  wherein the chunk allocator is configured to score each stripeset in a group of stripesets based at least in part on a number of unused chunks in the stripeset and a number of chunks on the stripeset being used by the filesystem; and allocate a chunk on the stripeset with the highest score, wherein the allocated chunk lies outside of runs reserved for other filesystems.

P26. A data storage system according to claim P25, wherein the file server is further configured to determine a default run bias.

P27. A data storage system according to claim P25, wherein the file server is further configured to determine the run bias based on a number of stripesets and a number of filesystems.

P28. A data storage system according to claim P25, wherein the chunk allocator is further configured to determine that a chunk after a last allocated chunk of the filesystem is available; determine a bias factor for a current stripeset of the filesystem, wherein the current stripeset includes the last allocated chunk of the filesystem; and score the current stripeset with the bias factor.

P29. A data storage system according to claim P25, wherein the chunk allocator is further configured to determine that a chunk after a last allocated chunk of the filesystem is used by another filesystem; and score each stripeset in a group of stripesets based at least in part on a difference between a number of unused chunks on the stripeset and a number of chunks reserved for other filesystems.

P30. A data storage system according to claim P25, wherein the chunk allocator is further configured to score each stripeset in the group of stripesets based at least in part on a number of unused chunks on the stripeset, a span weight, a number of chunks on the stripeset being used by the filesystem, and a filesystem weight.

P31. A data storage system according to claim P25, wherein the chunk allocator is further configured to select a chunk after a last allocated chunk of the filesystem.

P32. A data storage system according to claim P25, wherein the chunk allocator is further configured to search for a run of unreserved chunks whose length is at least the run bias; and select a first chunk in the run.

P33. A data storage system according to claim P25, wherein the chunk allocator is further configured to search for a run of reserved chunks whose length is at least the run bias; and select a first chunk in a second half of the run.

P34. A method of expanding storage for a filesystem by a file server, the filesystem including a plurality of chunks selected from a plurality of stripesets, the file server mapping a virtual address space of the filesystem to physical storage addresses associated with the chunks, the method comprising, by the file server:
  maintaining a chunk database to track the chunks associated with a plurality of filesystems, the chunk database including a fixed number of entries, each entry capable of storing information regarding the starting address and length of a portion of storage allocated one of the filesystems;
  receiving a request to expand a filesystem in the plurality of filesystems;
  selecting a stripeset from which to allocate storage;
  retrieving an entry from the chunk database with a starting address on the stripeset, wherein the entry corresponds to a live run of a different filesystem in the plurality of filesystems;
  identifying at least one chunk on the stripeset that is positioned after N chunks that follow and are contiguous with a last chunk in the live run, wherein N is equal to a run bias minus an active run length of the live run; and
  allocating the at least one chunk to the filesystem if the at least one chunk is available.

P35. The method of claim P34, further comprising:
  continuing to retrieve entries from the chunk database with a starting address on the stripeset and identify at least one chunk that is positioned after N chunks that follow and are contiguous with a last chunk in the live run until the at least one chunk is available.

P36. The method of claim P34, wherein identifying the at least one chunk on the stripeset comprises:
  identifying a run of available chunks equal to a run bias.

P37. The method of claim P34, wherein identifying the at least one chunk on the stripeset comprises:
  identifying a longest run of available chunks on the stripeset.

P38. A data storage system comprising:
  a memory in which is stored a chunk database for tracking chunks associated with a plurality of filesystems, the chunk database including a fixed number of entries, each entry capable of storing information regarding the starting address and length of a portion of storage allocated to the filesystem; and
  a chunk allocator configured to receive a request to expand a filesystem in the plurality of filesystems, select a stripeset from which to allocate storage, retrieve an entry from the chunk database with a starting address on the stripeset, wherein the entry corresponds to a live run of a different filesystem in the plurality of filesystems, identify at least one chunk on the stripeset that is positioned after N chunks that follow and are contiguous with a last chunk in the live run, wherein N is equal to a run bias minus an active run length of the live run, and allocate the at least one chunk to the filesystem if the at least one chunk is available.

P39. The data storage system according to claim P38, wherein the chunk allocator is further configured to continue to retrieve entries from the chunk database with a starting address on the stripeset and identify at least one chunk that is positioned after N chunks that follow and are contiguous with a last chunk in the live run until the at least one chunk is available.

P40. The data storage system according to claim P38, wherein the chunk allocator is further configured to identify a run of available chunks equal to a run bias.

P41. The data storage system according to claim P38, wherein the chunk allocator is further configured to identify a longest run of available chunks on the stripeset.

P42. A method of expanding storage for a filesystem by a file server, the filesystem including a plurality of chunks selected from a plurality of stripesets, the file server mapping a virtual address space of the filesystem to physical storage addresses associated with the chunks, the method comprising, by the file server:
  maintaining a chunk database to track the chunks associated with a plurality of filesystems, the chunk database including a fixed number of entries, each entry capable of storing information regarding the starting address and length of a portion of storage allocated one of the filesystems;
  receiving a request to expand a filesystem in the plurality of filesystems;
  determining that a number of chunks for the request exceeds the product of a number of chunks in a run bias and a number of stripesets on a span;
  determining a number of chunks to allocate from each stripeset by dividing the number of chunks for the request by the number of stripesets;
  searching, on each stripeset, for a run of available chunks equal to the number of chunks to allocate from each stripeset;
  allocating, from each stripeset, the run of available chunks; and creating, for each run of available chunks, an entry in the chunk database associated with the run of available chunks, wherein the entry includes a length of the run.

P43. A data storage system comprising:
a memory in which is stored a chunk database for tracking chunks associated with a plurality of filesystems, the chunk database including a fixed number of entries, each entry capable of storing information regarding the starting address and length of a portion of storage allocated to one of the filesystem; and
a chunk allocator configured to receive a request to expand a filesystem in the plurality of filesystems, determine that a number of chunks for the request exceeds the product of a number of chunks in a run bias and a number of stripesets on a span, determine a number of chunks to allocate from each stripeset by dividing the number of chunks for the request by the number of stripesets, search, on each stripeset, for a run of available chunks equal to the number of chunks to allocate from each stripeset, allocate, from each stripeset, the run of available chunks, and create, for each run of available chunks, an entry in the chunk database associated with the run of available chunks, wherein the entry includes a length of the run.

The present invention may be embodied in other specific forms without departing from the true scope of the invention. The described embodiments are to be considered in all respects only as illustrative and not restrictive.

What is claimed is:

1. A non-transitory computer readable storage medium comprising computer-readable program instructions which, when running on or loaded into a file server or computer connected to the server or when being executed by one or more processors or processing units of the file server or the computer, cause the file server or computer to execute a method of expanding storage for a file system managed by the file server or computer,
wherein the file server or computer is configured to manage storage based on a plurality of stripesets, each stripeset corresponding to a contiguous storage space including a plurality of chunks, and the file system resides on a virtualized storage region of allocated chunks among the plurality of chunks of the plurality of stripesets, the method comprising:
maintaining a chunk database indicative of the allocated chunks of the file system, the chunk database including a fixed number of entries, and each entry for one or more contiguous allocated chunks being adapted to store information indicative of a starting address and an ending address of the one or more contiguous allocated chunks, the chunk database further including a particular entry identifying an end address of a last allocated chunk, and other entries of the fixed number of entries corresponding to free blocks available to be allocated;
identifying, upon receiving a request to expand the storage for the file system, the last allocated chunk based on the entries of the maintained chunk database;
allocating one or more further chunks being selected from the same stripeset as the identified last allocated chunk and being contiguous with the identified last allocated chunk up to a predetermined run bias calculated based on a number of stripesets and a number of file systems and then comparing the calculated run bias to a default run bias and selecting a smaller of the calculated run bias and the default run bias as the predetermined run bias;
updating the particular entry in the chunk database to reflect an increase in a length of a run of contiguous allocated chunks including the identified last chunk and the one or more further chunks by modifying the end address of the particular entry; and
reserving the one or more further chunks prior to allocating the one or more further chunks so that the one or more further chunks remain available for allocation to the file system; or
reserving, after allocating the one or more further chunks, one or more chunks of the same stripeset as the identified last allocated chunk and being contiguous with the one or more further chunks, which have been allocated, to remain available for allocation to the file system,
wherein a number of the other entries of the fixed number of entries corresponding to free blocks available to be allocated is maintained for allocation to the file system after updating the particular entry,
wherein when allocating a new chuck from a new stripeset to another entry in the chuck database, searching for another run of unreserved contiguous chunks equal to the predetermined run bias and allocating the first chunk of the another run of unreserved contiguous chunks to the another entry in the chunk database, and
wherein up to N chunks are reserved, N being equal to the predetermined run bias minus an active run length, which indicates a number of contiguous chunks including the last allocated chunk.

2. The non-transitory computer readable storage medium according to claim 1, the method further comprising:
determining that there is at least one further chunk available for allocation to the file system if the determined active run length is less than the predetermined run bias, which indicates a preferred length of a run of one or more contiguous allocated chunks, and there is at least one further chunk from the same stripeset as the last allocated chunk and contiguous with the last allocated chunk.

3. The non-transitory computer readable storage medium according to claim 2, wherein allocating one or more further chunks comprises:
allocating up to N further chunks from the same stripeset as the identified last allocated chunk and contiguous with the identified last allocated chunk, wherein N is equal to the run bias minus the active run length.

4. The non-transitory computer readable storage medium according to claim 1, the method further comprising:
determining, prior to allocating the one or more further chunks, if the one or more further chunks being selected from the same stripeset as the identified last allocated chunk and being contiguous with the identified last chunk are available for allocation to the file system.

5. The non-transitory computer readable storage medium according to claim 4, the method further comprising:
selecting, if one or more further chunks from the same stripeset as the identified last allocated chunk and being contiguous with the identified last allocated chunk are determined to be unavailable, another stripeset being different than the stripeset of the identified last allocated chunk; and
allocating one or more further chunks from the other stripeset.

6. The non-transitory computer readable storage medium according to claim 5, wherein, if the other stripeset includes a run of one of more contiguous chunks which are reserved for allocation to another file system, the method further comprises searching the other stripeset for another run of one or more unreserved chunks whose length corresponds at least to a run bias which indicates a preferred length of a run of one or more contiguous allocated chunks, and selecting a first chunk in the searched run for allocation to the file system.

7. The non-transitory computer readable storage medium according to claim 5, wherein, if the other stripeset includes a run of one of more contiguous chunks which are reserved for allocation to another file system, the method further comprises searching the other stripeset for a longest run of one or more unreserved chunks on the other stripeset, and selecting a first chunk in the searched longest run for allocation to the file system.

8. The non-transitory computer readable storage medium according to claim 1, wherein the file server is configured to map a virtual address space of the file system to physical storage addresses associated with the plurality of chunks.

9. A method of expanding storage for a file system managed by a file server, the file server being configured to manage storage based on a plurality of stripesets, each stripeset corresponding to a contiguous storage space including a plurality of chunks, the file system residing on a virtualized storage region of allocated chunks among the plurality of chunks of the plurality of stripesets, the method comprising:

maintaining a chunk database indicative of the allocated chunks of the file system, the chunk database including a fixed number of entries, and each entry for one or more contiguous allocated chunks being adapted to store information indicative of a starting address and an ending address of one or more contiguous allocated chunks, the chunk database further including a particular entry identifying an end address of a last allocated chunk, and other entries of the fixed number of entries corresponding to free blocks available to be allocated;

identifying, upon receiving a request to expand the storage for the files system, the last allocated chunk based on the entries of the maintained chunk database;

allocating one or more further chunks being selected from the same stripeset as the identified last allocated chunk and being contiguous with the identified last allocated chunk up to a predetermined run bias calculated based on a number of stripesets and a number of file systems and then comparing the calculated run bias to a default run bias and selecting a smaller of the calculated run bias and the default run bias as the predetermined run bias;

updating the particular entry in the chunk database associated with the identified last allocated chunk to reflect an increase in a length of a run of contiguous allocated chunks including the identified last chunk and the one or more further chunks by modifying the end address of the particular entry; and reserving the one or more further chunks prior to allocating the one or more further chunks so that the one or more further chunks remain available for allocation to the file system; or reserving, after allocating the one or more further chunks, one or more chunks of the same stripeset as the identified last allocated chunk and being contiguous with the one or more further chunks, which have been allocated, to remain available for allocation to the file system, wherein a number of the other entries of the fixed number of entries corresponding to free blocks available to be allocated is maintained for allocation to the file system after updating the particular entry, wherein when allocating a new chuck from a new stripeset to another entry in the chuck database, searching for another run of unreserved contiguous chunks equal to the predetermined run bias and allocating the first chunk of the another run of unreserved contiguous chunks to the another entry in the chunk database, and wherein up to N chunks are reserved, N being equal to the predetermined run bias minus an active run length, which indicates a number of contiguous chunks including the last allocated chunk.

10. A file server managing a file system, the file server being configured to expand storage for the managed file system, and to manage storage based on a plurality of stripesets, each stripeset corresponding to a contiguous storage space including a plurality of chunks, wherein the file system resides on a virtualized storage region of allocated chunks among the plurality of chunks of the plurality of stripesets, the file server being configured to execute:

maintaining a chunk database indicative of the allocated chunks of the file system, the chunk database including a fixed number of entries and each entry for one or more contiguous allocated chunks being adapted to store information indicative of a starting address and an ending address of one or more contiguous allocated chunks, the chunk database further including a particular entry identifying an end address of a last allocated chunk, and other entries of the fixed number of entries corresponding to free blocks available to be allocated;

identifying, upon receiving a request to expand the storage for the files system, the last allocated chunk based on the entries of the maintained chunk database;

allocating one or more further chunks being selected from the same stripeset as the identified last allocated chunk and being contiguous with the identified last allocated chunk up to a predetermined run bias calculated based on a number of stripesets and a number of file systems and then comparing the calculated run bias to a default run bias and selecting a smaller of the calculated run bias and the default run bias as the predetermined run bias;

updating the particular entry in the chunk database associated with the identified last allocated chunk to reflect an increase in a length of a run of contiguous allocated chunks including the identified last chunk and the one or more further chunks by modifying the end address of the particular entry; and reserving the one or more further chunks prior to allocating the one or more further chunks so that the one or more further chunks remain available for allocation to the file system; or reserving, after allocating the one or more further chunks, one or more chunks of the same stripeset as the identified last allocated chunk and being contiguous with the one or more further chunks, which have been allocated, to remain available for allocation to the file system, wherein a number of the other entries of the fixed number of entries corresponding to free blocks available to be allocated is maintained for allocation to the file system after updating the particular entry, wherein when allocating a new chuck from a new stripeset to another entry in the chuck database, searching for another run of unreserved contiguous chunks equal to the predetermined run bias and allocating the first chunk of the another run of unreserved contiguous chunks to the another entry in the chunk database, and wherein up to N chunks are reserved, N being equal to the predetermined run bias minus an active run length, which indicates a number of contiguous chunks including the last allocated chunk.

11. A file storage system, comprising:
a) a file server configured to expand storage for the managed file system, and to manage storage based on a plurality of stripesets, each stripeset corresponding to a contiguous storage space including a plurality of chunks, wherein the file system resides on a virtualized storage region of allocated chunks among the plurality of chunks of the plurality of stripesets, the file server being configured to execute:
  (i) maintaining a chunk database indicative of the allocated chunks of the file system, the chunk database including a fixed number of entries and each entry for one or more contiguous allocated chunks being adapted to store information indicative of a starting address and an ending address one or more contiguous allocated chunks, the chunk database further including a particular entry identifying an end address of a last allocated chunk, and other entries of the fixed number of entries corresponding to free blocks available to be allocated;
  (ii) identifying, upon receiving a request to expand the storage for the files system, the last allocated chunk based on the entries of the maintained chunk database;
  (iii) allocating one or more further chunks being selected from the same stripeset as the identified last allocated chunk and being contiguous with the identified last allocated chunk up to a predetermined run bias calculated based on a number of stripesets and a number of file systems and then comparing the calculated run bias to a default run bias and selecting a smaller of the calculated run bias and the default run bias as the predetermined run bias;
  (iv) updating the particular entry in the chunk database associated with the identified last allocated chunk to reflect an increase in a length of a run of contiguous allocated chunks including the identified last chunk and the one or more further chunks by modifying the end address of the particular entry; and
  (v)(1) reserving the one or more further chunks prior to allocating the one or more further chunks so that the one or more further chunks remain available for allocation to the file system; or
  (v)(2) reserving, after allocating the one or more further chunks, one or more chunks of the same stripeset as the identified last allocated chunk and being contiguous with the one or more further chunks, which have been allocated, to remain available for allocation to the file system,
wherein a number of the other entries of the fixed number of entries corresponding to free blocks available to be allocated is maintained for allocation to the file system after updating the particular entry,
wherein when allocating a new chuck from a new stripeset to another entry in the chuck database, searching for another run of unreserved contiguous chunks equal to the predetermined run bias and allocating the first chunk of the another run of unreserved contiguous chunks to the another entry in the chunk database, and
wherein up to N chunks are reserved, N being equal to the predetermined run bias minus an active run length, which indicates a number of contiguous chunks including the last allocated chunk; and
b) one or more RAID systems providing storage for one or more file systems managed by the file server.

* * * * *